US011506275B2

(12) United States Patent
Nakasone et al.

(10) Patent No.: US 11,506,275 B2
(45) Date of Patent: Nov. 22, 2022

(54) HYDRAULIC CONTROL DEVICE

(71) Applicant: Honda Motor Co., Ltd., Tokyo (JP)

(72) Inventors: Makito Nakasone, Saitama (JP); Koji Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 17/094,825

(22) Filed: Nov. 11, 2020

(65) Prior Publication Data

US 2021/0140534 A1 May 13, 2021

(30) Foreign Application Priority Data

Nov. 12, 2019 (JP) .............................. JP2019-205047

(51) Int. Cl.
*F16H 57/04* (2010.01)
*F16H 61/00* (2006.01)

(52) U.S. Cl.
CPC ..... *F16H 57/0436* (2013.01); *F16H 57/0435* (2013.01); *F16H 57/0446* (2013.01); *F16H 61/0025* (2013.01)

(58) Field of Classification Search
CPC ............. F16H 57/0436; F16H 57/0435; F16H 57/0446; F16H 61/0025
See application file for complete search history.

(56) References Cited

U.S. PATENT DOCUMENTS

| 2001/0023217 A1 | 9/2001 | Miyagawa et al. |
| 2014/0119948 A1 | 5/2014 | Wi et al. |
| 2014/0294599 A1 | 10/2014 | Wi et al. |

(Continued)

FOREIGN PATENT DOCUMENTS

| CN | 102403947 | 4/2012 |
| CN | 106233044 | 12/2016 |
| CN | 109386512 | 2/2019 |

(Continued)

OTHER PUBLICATIONS

Yang Liu et al., "Dynamic Analysis and Control Strategy of Dual-Dump System for Automatic Transmission of Microhybrid Electric Vehicle", Automotive Engineering, with English translation thereof, Aug. 25, 2017, pp. 1-27.

(Continued)

*Primary Examiner* — Thomas E Lazo
*Assistant Examiner* — Daniel S Collins
(74) *Attorney, Agent, or Firm* — JCIPRNET

(57) ABSTRACT

The disclosure provides a hydraulic control device capable of suppressing an excessive increase in the rotation speed of a second pump and stabilizing the discharge pressure of the second pump. The target rotation speed of the second pump for making a pressure value of a first oil close to an estimated value of a pressure value of a third oil is calculated, and a feedback amount with respect to the target rotation speed is calculated by subtracting the estimated value of the pressure value of the third oil from the pressure value of the first oil detected by a hydraulic sensor. Time regions for performing calculation of the feedback amount include an update region in which the feedback amount with respect to the target rotation speed is updated, and a hold region in which update of the feedback amount with respect to the target rotation speed is temporarily stopped.

6 Claims, 14 Drawing Sheets

(56) References Cited

U.S. PATENT DOCUMENTS

2019/0048998 A1* 2/2019 Harada ............... F16H 61/0009

FOREIGN PATENT DOCUMENTS

| CN | 109386602 | 2/2019 |
| CN | 109386607 | 2/2019 |
| CN | 109386610 | 2/2019 |
| JP | 2006161837 | 6/2006 |
| JP | 2015200369 | 11/2015 |
| JP | 2019035426 | 3/2019 |

OTHER PUBLICATIONS

Office Action of China Counterpart Application, with English translation thereof, dated Nov. 24, 2021, pp. 1-10.

* cited by examiner

HYDRAULIC CONTROL DEVICE

CROSS-REFERENCE TO RELATED APPLICATION

This application claims the priority benefit of Japan application serial no. 2019-205047, filed on Nov. 12, 2019. The entirety of the above-mentioned patent application is hereby incorporated by reference herein and made a part of this specification.

BACKGROUND

Technical Field

The disclosure relates to a hydraulic control device in which a second pump and a bypass valve are connected in parallel between a first pump and a hydraulic operation part, and which supplies a first oil from the first pump to the hydraulic operation part via the bypass valve, or which pressurizes the first oil with the second pump and supplies the pressurized first oil as a second oil to the hydraulic operation part.

Description of Related Art

For example, Patent Document 1 discloses a hydraulic control device of a vehicle transmission in which a second pump (electric pump) and a bypass valve (check valve) operated by the drive of a motor are connected in parallel between a first pump (mechanical pump) and a hydraulic operation part of the transmission. In this case, when the engine is started, first, a first oil is supplied from the first pump to the hydraulic operation part via the bypass valve (first state). After that, the second pump is driven by the drive of the motor, and the first oil supplied from the first pump is pressurized by the second pump, and the pressurized first oil is supplied as the second oil from the second pump to the hydraulic operation part (second state). The hydraulic operation part includes, for example, an oil chamber of pulleys (drive pulley and driven pulley) of a belt-type continuously variable transmission.

In the hydraulic control device having the above configuration, switching between the first state in which the first oil is supplied to the hydraulic operation part (continuously variable transmission) and the second state in which the second oil is supplied is performed by opening and closing the bypass valve. That is, when the discharge amount (flow rate) of the second oil from the second pump exceeds the flow rate (discharge amount of the first oil from the first pump) of the first oil passing through the bypass valve, the hydraulic pressure (line pressure PH) in the downstream oil passage of the bypass valve becomes higher than the hydraulic pressure (output pressure P1) in the upstream oil passage. In this way, the bypass valve is closed, and the supply of the first oil from the first pump to the hydraulic operation part via the bypass valve is switched to the supply of the second oil from the second pump to the hydraulic operation part. As a result, the flow of the first oil to the oil passage is blocked, and the second oil is pumped to the hydraulic operation part by the second pump. On the other hand, when the discharge amount of the second pump is reduced due to the stop or the low rotation state of the second pump, the bypass valve is in the valve open state, and the first oil is supplied to the hydraulic operation part.

In the above hydraulic control device, the work load of the first pump is reduced by driving the second pump in the second state. At that time, the target rotation speed of the second pump is calculated by performing a feedback control using the hydraulic pressure of the oil (discharge pressure of the first pump) detected by the hydraulic sensor provided on the suction side of the second pump. (Patent Document 2)

However, in this hydraulic control device, it is a characteristic of the second pump that the torque of the second pump (which is an electric pump) tends to decrease as the rotation speed increases. Therefore, when the rotation speed of the second pump increases too much due to the increase in the feedback amount in the feedback control, the discharge pressure of the second pump may become unstable. As a result, the hydraulic pressure supplied to the hydraulic operation part may not be stable, and the effect of reducing the fuel consumption of the vehicle may not be sufficiently obtained.

RELATED ART

Patent Document

[Patent Document 1] Japanese Laid-open No. 2015-200369

[Patent Document 2] Japanese Laid-open No. 2019-35426

The disclosure has been made in view of the above-mentioned problems of the conventional technology, and the disclosure provides a hydraulic control device capable of suppressing an excessive increase in the rotation speed of the second pump due to the feedback control in calculating the target rotation speed of the second pump and stabilizing the discharge pressure of the second pump.

SUMMARY

In view of the foregoing, a hydraulic control device (10) according to the disclosure, in which a second pump (30) and a bypass valve (58) that are driven by a motor (32) are connected in parallel between a first pump (20) and a hydraulic operation part (56) of a transmission, and which is switchable between a first state of supplying a first oil from the first pump (20) to the hydraulic operation part (56) via the bypass valve (58) and a second state of pressurizing with the second pump (30) the first oil supplied from the first pump (20) and supplying the pressurized first oil as a second oil to the hydraulic operation part (56), includes: a hydraulic pressure detection part (26) which detects an oil pressure (P1) of the first oil on a suction side in the second pump (30); and a control part (28) which calculates a target rotation speed (NA) of the second pump (30) in the second state. The control part (28) uses a pressure value (P1) of the first oil detected by the hydraulic pressure detection part (26), an estimated value of a pressure value (PH) of oil supplied to the hydraulic operation part (56), and an estimated value of a pressure value (P3) of a third oil supplied from the first pump (20) to another hydraulic operation part (114) or a lubrication target (108) operating at a lower pressure than the hydraulic operation part (56) in the transmission to calculate the target rotation speed (NA) of the second pump (30) for matching the pressure value (P1) of the first oil with the estimated value of the pressure value (P3) of the third oil, and subtracts the estimated value of the pressure value (P3) of the third oil from the pressure value (P1) of the first oil detected by the hydraulic pressure detection part (26) to calculate a feedback amount with respect to the target rotation speed (NA). Time regions for performing calculation of the feedback amount include: an update region in which the feedback amount with respect to the target rotation speed is updated; and a hold region in which update of the feedback amount with respect to the target rotation speed is temporarily stopped.

DESCRIPTION OF THE EMBODIMENTS

Figure 1:
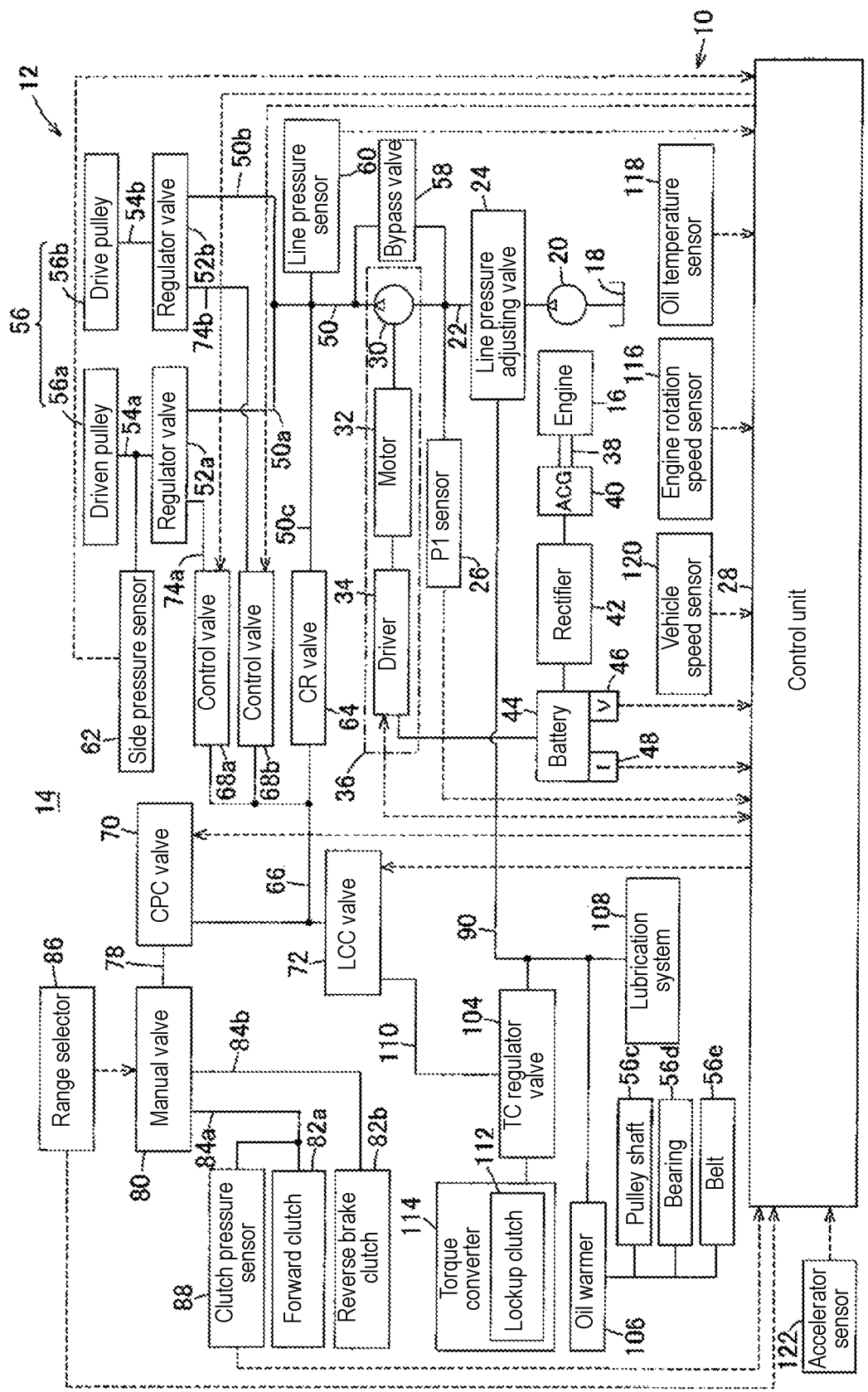
FIG. 1 is a configuration diagram of a hydraulic control device according to an embodiment of the disclosure.

According to the hydraulic control device of the disclosure, in the calculation of the feedback amount with respect to the target rotation speed of the second pump, the time regions for performing calculation of the feedback amount include the update region in which the feedback amount of the target rotation speed is updated and the hold region in which the update of the feedback amount of the target rotation speed is temporarily stopped; as a result, compared with a case where the update of the feedback amount is continuously updated without being temporarily stopped, since an excessive increase in the rotation speed of the second pump, which is an electric pump, can be suppressed, the discharge pressure of the second pump can be stabilized. Therefore, since the operation of the hydraulic operation part can be stabilized, the effect of reducing the fuel consumption of the vehicle can be obtained more reliably. Further, the calculation of the feedback amount in the disclosure means that the pressure value of the first oil detected by the hydraulic pressure detection part and the estimated value of the pressure value of the third oil are compared to calculate a value so that the two are matched, or can be regarded as matching, by the difference between them.

Further, in this hydraulic control device (10), switching from the update region to the hold region may be performed based on that an actual rotation speed (NB) of the second pump (30) with respect to the target rotation speed (NA) of the second pump (30) has become outside a predetermined range (L1). Further, in this case, switching from the hold region to the update region may be performed based on that the actual rotation speed (NB) of the second pump (30) with respect to the target rotation speed (NA) of the second pump (30) has changed from being outside the predetermined range (L1) to being within the predetermined range (L1).

According to this configuration, the update region is switched to the hold region when the actual rotation speed of the second pump with respect to the target rotation speed of the second pump falls outside the predetermined range, whereby the actual rotation speed can be prevented from becoming a value that deviates significantly from the target rotation speed, and the accuracy of the actual rotation speed with respect to the target rotation speed can be improved.

Further, since the hold region is switched to the update region when the actual rotation speed of the second pump with respect to the target rotation speed of the second pump returns to the predetermined range, the update of the feedback amount is restarted when the actual rotation speed is close to the target rotation speed, whereby the actual rotation speed can be transitioned to the final target rotation speed earlier.

Further, in this hydraulic control device (10), the control part (28) may end a feedback control and transition to a control which keeps the target rotation speed (NA) constant on a condition that a predetermined time has elapsed since a difference between the pressure value (P1) of the first oil and the estimated value of the pressure value (P3) of the third oil becomes less than or equal to a predetermined value and that the difference between the pressure value (P1) of the first oil and the estimated value of the pressure value (P3) of the third oil per predetermined time has become within a predetermined range.

When the feedback control is continued, since the feedback amount is continuously updated, the target rotation speed of the second pump continues to increase, and the fuel efficiency of the vehicle may deteriorate. Then, the degree of deterioration of fuel efficiency is larger compared with a case where the feedback amount is fixed. Therefore, here, when the above condition is satisfied, the feedback control is ended, and the control is transitioned to the control which keeps the target rotation speed constant.

The reference numerals in parentheses above indicate the drawing reference numbers of the corresponding components in the embodiments described later for reference.

In the hydraulic control device according to the disclosure, an excessive increase in the rotation speed of the second pump due to the feedback control in calculating the target rotation speed of the second pump can be suppressed, and the discharge pressure of the second pump can be stabilized.

Hereinafter, embodiments of the disclosure will be described with reference to the accompanying drawings. FIG. 1 is a configuration diagram of a hydraulic control device according to an embodiment of the disclosure. A hydraulic control device 10 shown in the figure is applied to, for example, a vehicle 14 equipped with a transmission 12 which is a continuously variable transmission (CVT).

The hydraulic control device 10 has a first pump (mechanical pump) 20 that is driven by an engine 16 of the vehicle 14 and pumps up and delivers oil (hydraulic oil) stored in a reservoir 18. An oil passage 22 for flowing the oil pumped from the first pump 20 as a first oil is connected to the output side of the first pump 20. A line pressure adjusting valve (pressure adjusting valve) 24, which is a spool valve, is provided in the middle of the oil passage 22.

In the oil passage 22, an output pressure sensor (P1 sensor) 26 is disposed on the downstream side of the line pressure adjusting valve 24. The output pressure sensor 26 is a hydraulic sensor which sequentially detects the pressure (output pressure of the first pump 20) P1 of the first oil flowing through the oil passage 22, and which sequentially outputs a detection signal indicating the detected output pressure P1 to a control unit 28 (to be described later). Further, a second pump 30 having a capacity smaller than that of the first pump 20 is connected to the downstream side of the oil passage 22.

The second pump 30 is an electric pump which is driven by the rotation of a motor 32 provided in the vehicle 14 and which outputs the first oil supplied through the oil passage 22 as a second oil. In this case, the second pump 30 can pressurize the supplied first oil and pump the pressurized first oil as the second oil. The motor 32 rotates under the control of a driver 34. The driver 34 controls the drive of the motor 32 based on the control signal supplied from the control unit 28, and sequentially outputs a signal indicating the drive state of the motor 32 (for example, the rotation speed Nem of the motor 32 according to the rotation speed Nep of the second pump 30) to the control unit 28. An electric pump unit 36 is configured by the second pump 30, the motor 32, and the driver 34.

In addition, an ACG (alternating current generator) 40 is connected to a crankshaft 38 of the engine 16. The ACG 40 generates power by rotation of the crankshaft 38 due to the drive of the engine 16. The AC power generated by the ACG 40 is rectified by a rectifier 42 and charged into a battery 44. The battery 44 is provided with a voltage sensor 46 which detects a voltage V of the battery 44 and a current sensor 48 which detects a current I flowing from the battery 44. The voltage sensor 46 sequentially detects the voltage V of the battery 44, and sequentially outputs a detection signal indicating the detected voltage V to the control unit 28. The current sensor 48 sequentially detects the current I flowing from the battery 44, and sequentially outputs a detection signal indicating the detected current I to the control unit 28. The driver 34 is driven by the power supply from the battery 44.

An oil passage 50 is connected to the output side of the second pump 30. The oil passage 50 is branched into two oil passages 50a and 50b on the downstream side. One oil passage 50a is connected to a driven pulley 56a, which configures a belt-type continuously variable transmission mechanism 56 of the transmission 12, via a regulator valve 52a and an oil passage 54a. The other oil passage 50b is connected to a drive pulley 56b, which configures the continuously variable transmission mechanism 56, via a regulator valve 52b and an oil passage 54b.

A bypass valve 58 is connected in parallel with the second pump 30 between the two oil passages 22 and 50. The bypass valve 58 is a check valve provided so as to bypass the second pump 30, and allows the flow of oil (first oil) from the oil passage 22 on the upstream side to the oil passage 50 on the downstream side, while blocking the flow of oil (second oil) from the oil passage 50 on the downstream side to the oil passage 22 on the upstream side.

Further, the oil passage 54a is provided with a side pressure sensor 62 as a hydraulic sensor for detecting the pressure PDN (the pulley pressure, which is the side pressure of the driven pulley 56a) of the oil supplied to the driven pulley 56a.

A CR valve 64 is connected to the downstream side of an oil passage 50c branching from the oil passage 50. The upstream side of the CR valve 64 is connected to the oil passage 50c, and the downstream side thereof is connected to two control valves 68a and 68b, a CPC valve 70 and an LCC valve 72 via an oil passage 66. The CR valve 64 is a pressure reducing valve which decompresses the oil (second oil) supplied from the oil passage 50c, and supplies the decompressed oil to the control valves 68a and 68b, the CPC valve 70, and the LCC valve 72 via the oil passage 66.

Each of the control valves 68a and 68b is a normally open type solenoid valve having a solenoid, and is in a valve closed state while the control signal (current signal) is supplied from the control unit 28 and the solenoid is energized, and is in a valve open state when the solenoid is not energized.

Figure 2:
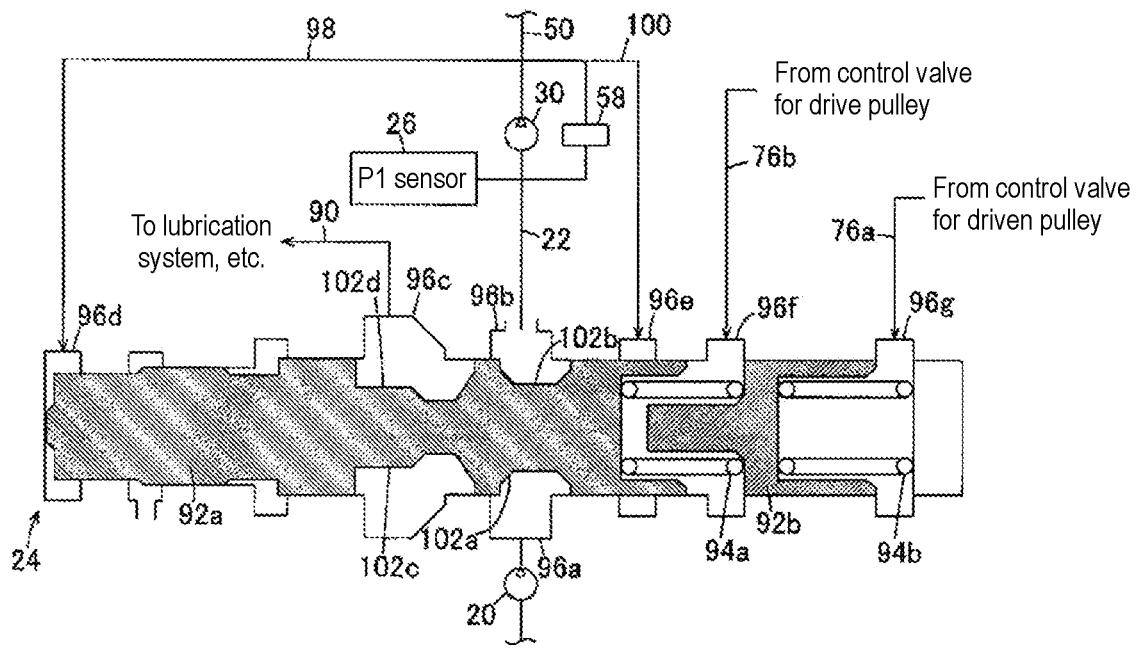
FIG. 2 is a configuration diagram of the line pressure adjusting valve.

One control valve 68a is a solenoid valve for the driven pulley 56a, and in the valve open state, the control valve 68a supplies the oil supplied from the CR valve 64 via the oil passage 66 to the regulator valve 52a via an oil passage 74a and also to the line pressure adjusting valve 24 via an oil passage 76a (see FIG. 2). In FIG. 1, for convenience, the oil passage 76a is not shown.

Further, the other control valve 68b is a solenoid valve for the drive pulley 56b, and in the valve open state, the control valve 68b supplies the oil supplied from the CR valve 64 via the oil passage 66 to the regulator valve 52b via an oil passage 74b and also to the line pressure adjusting valve 24 via an oil passage 76b (see FIG. 2). In addition, the oil passage 76b is also omitted in FIG. 1 for convenience.

Therefore, in one regulator valve 52a, the pressure of the oil supplied from the control valve 68a via the oil passage 74a is used as a pilot pressure, and when the line pressure PH of the oil supplied via the oil passages 50 and 50a is greater than or equal to the predetermined pressure, the valve is opened and the oil is supplied to the driven pulley 56a via the oil passage 54a. Further, in the other regulator valve 52b, the pressure of the oil supplied from the control valve 68b via the oil passage 74b is used as a pilot pressure, and when the line pressure PH of the oil supplied via the oil passages 50 and 50b is greater than or equal to the predetermined pressure, the valve is in the valve open state, and the oil is supplied to the drive pulley 56b via the oil passage 54b.

In addition, the control valve 68a can adjust the pressure of the oil output to the oil passages 74a and 76a. Further, the control valve 68b can adjust the pressure of the oil output to the oil passages 74b and 76b.

The upstream side of the CPC valve 70 is connected to the oil passage 66, and the downstream side thereof is connected to a manual valve 80 via an oil passage 78. The CPC valve 70 is a solenoid valve for a forward clutch 82a and a reverse brake clutch 82b. In this case, while the control signal is supplied from the control unit 28 and the solenoid is energized, the CPC valve 70 is in the valve open state, and the oil passages 66 and 78 are communicated with each other, and the oil is supplied to the manual valve 80.

The upstream side of the manual valve 80 is connected to the oil passage 78; the downstream side thereof is connected to the forward clutch 82a via an oil passage 84a, and is connected to the reverse brake clutch 82b via an oil passage 84b. The manual valve 80 is a spool valve, and when a driver operates a range selector 86 provided near the driver's seat of the vehicle 14 to select any one of the shift ranges such as P (parking), R (reverse), N (neutral), and D (forward, drive), in the manual valve 80, a spool (not shown) moves for a predetermined amount in the axial direction according to the selected shift range. In this way, the manual valve 80 enables the vehicle 14 to travel in the forward direction by supplying the oil supplied via the oil passage 78 to the forward clutch 82a via the oil passage 84a, or enables the vehicle 14 to travel in the reverse direction by supplying the oil to the reverse brake clutch 82b via the oil passage 84b. A clutch pressure sensor 88 for detecting the pressure (clutch pressure) of the oil supplied to the oil passage 84a is provided in the middle of the oil passage 84a.

A low-pressure hydraulic operation part to which the first oil is supplied via an oil passage 90 is connected to the oil passage 90 that branches from the oil passage 22 via the line pressure adjusting valve 24. A TC regulator valve 104 and an oil warmer 106 are connected to the downstream side of the oil passage 90 as the low-pressure hydraulic operation part, and a lubrication system 108 of the transmission 12 is connected as a lubrication target. The TC regulator valve 104 is connected to the LCC valve 72 via an oil passage 110, and a torque converter 114 incorporating a lockup clutch 112 is connected to the downstream side thereof.

The LCC valve 72 is a solenoid valve for the lockup clutch 112, and while the control signal is supplied from the control unit 28 and the solenoid is energized, the LCC valve 72 is in the valve open state, and the oil passages 66 and 110 are communicated with each other to supply the oil to the TC regulator valve 104. The TC regulator valve 104 is a spool valve, and the spool (not shown) operates in the axial direction in response to the pressure of the oil supplied from the LCC valve 72 via the oil passage 110, whereby a third oil supplied via the oil passage 90 is decompressed, and the decompressed third oil is supplied to the torque converter 114 and the lockup clutch 112.

The oil warmer 106 warms the third oil supplied from the oil passage 90 to a predetermined temperature, and supplies the warmed third oil to a pulley shaft 56c, a bearing 56d, and a belt 56e that configure the continuously variable transmission mechanism 56. Further, the lubrication system 108 is various lubrication targets such as bearings and gears that configure the transmission 12.

The hydraulic control device 10 further includes an engine rotation speed sensor 116, an oil temperature sensor 118, a vehicle speed sensor 120, an accelerator sensor 122, and the control unit 28. The engine rotation speed sensor 116 sequentially detects the engine rotation speed New of the engine 16 according to the rotation speed Nmp of the first pump 20, and sequentially outputs a detection signal indicating the detected engine rotation speed New (rotation speed Nmp) to the control unit 28. The oil temperature sensor 118 sequentially detects the temperature (oil temperature) To of the first oil or the second oil, and sequentially outputs a detection signal indicating the detected oil temperature To to the control unit 28. The vehicle speed sensor 120 sequentially detects the vehicle speed Vs of the vehicle 14, and sequentially outputs a detection signal indicating the detected vehicle speed Vs to the control unit 28. The accelerator sensor 122 sequentially detects the opening degree of an accelerator pedal (not shown) operated by the driver, and sequentially outputs a detection signal indicating the detected opening degree to the control unit 28.

The control unit 28 is a microcomputer such as a CPU which functions as a TCU (transmission control unit) which controls the transmission 12 or an ECU (engine control unit) which controls the engine 16. Then, the control unit 28 executes various controls on the hydraulic control device by reading and executing programs stored in a storage unit (not shown).

[Line Pressure Adjusting Valve 24]

FIG. 2 is a configuration diagram of the line pressure adjusting valve 24. The line pressure adjusting valve 24 is a spool valve incorporating a first spool 92a and a second spool 92b. The first spool 92a is a relatively long valve body having a substantially I-shaped cross section, and is disposed inside the line pressure adjusting valve 24 along the axial direction (left-right direction in FIG. 2). The second spool 92b is a spool having a substantially Y-shaped cross section, which is shorter than the first spool 92a, and is disposed inside the line pressure adjusting valve 24 on the right side of the first spool 92a along the axial direction. In this case, a first elastic member 94a is inserted between the first spool 92a and the second spool 92b, and the first elastic member 94a urges the first spool 92a to the left direction in FIG. 2. Further, the second spool 92b is urged toward the first spool 92a side by a second elastic member 94b disposed on the right side of the second spool 92b.

The line pressure adjusting valve 24 has first to seventh ports 96a to 96g. The first port 96a and the second port 96b are provided so as to face each other at the central part of the outer peripheral surface of the line pressure adjusting valve 24. Further, the first port 96a and the second port 96b are communicated with each other regardless of the position of the first spool 92a through a groove and the like (not shown) formed on the inner peripheral surface side of the line pressure adjusting valve 24 around the axial direction, and configures a part of the oil passage 22. In this case, the first port 96a is an inlet port for the first oil in the line pressure adjusting valve 24, and the second port 96b is an outlet port for the first oil.

Then, with the position of the second port 96b on the outer peripheral surface of the line pressure adjusting valve 24 as the center, the third port 96c and the fourth port 96d are sequentially provided on the left side of FIG. 2 so as to be separated from the second port 96b, while the fifth to seventh ports 96e to 96g are sequentially provided on the right side of FIG. 2 so as to be separated from the second port 96b.

The third port 96c is provided adjacent to the left side of the second port 96b, and the oil passage 90 is connected to the third port 96c. The fourth port 96d is provided at the left end of the line pressure adjusting valve 24, and is connected to the oil passage 50 via an oil passage 98. The fifth port 96e is provided adjacent to the right side of the second port 96b, and is connected to the oil passage 50 via an oil passage 100. In addition, in FIG. 1, for convenience, the oil passages 98 and 100 are not shown. The sixth port 96f is provided on the right side of the fifth port 96e and is connected to the oil passage 76b. The seventh port 96g is provided at the right end of the line pressure adjusting valve 24 and is connected to the oil passage 76a.

Therefore, oil (first oil or second oil) having the line pressure PH flowing through the oil passage 50 is supplied to the fourth port 96d and the fifth port 96e via the oil passages 98 and 100, respectively. Further, the oil is supplied from the control valve 68b to the sixth port 96f via the oil passage 76b. Moreover, the oil is supplied from the control valve 68a to the seventh port 96g via the oil passage 76a.

On the outer peripheral surface of the first spool 92a, by forming grooves in the parts facing the first port 96a and the second port 96b around the axial direction, the part facing the first port 96a is formed as a recess 102a, and the part facing the second port 96b is formed as a recess 102b.

Further, on the outer peripheral surface of the first spool 92a, a recess 102c adjacent to the recess 102a and a recess 102d adjacent to the recess 102b are formed by forming grooves in the parts facing the third port 96c around the axial direction.

Further, in the line pressure adjusting valve 24, the pressure (line pressure PH, output pressure P1) of the oil supplied to the fourth port 96d is greater than the pressure of the oil supplied to the sixth port 96f and the seventh port 96g. However, since the oil contact areas of the valves are different, the pressures are balanced, and when the oil with a pressure higher than the balance point is supplied to the fourth port 96d, the first spool 92a moves to the right side in FIG. 2 due to the line pressure PH against the elastic force of the first elastic member 94a and the pressure of the oil supplied to the sixth port 96f. As a result, the recess 102c and the first port 96a communicate with each other, and the first oil can flow into the oil passage 90 via the first port 96a, the recesses 102c and 102d, and the third port 96c. Further, in the line pressure adjusting valve 24, the pressure of the first oil flowing through the oil passage 90 may be less than the output pressure P1 of the first oil flowing through the second pump 30 and the bypass valve 58 via the oil passage 22. Therefore, in the following description, the first oil flowing through the oil passage 90 may be referred to as the third oil.

Next, the operation of the hydraulic control device 10 according to the embodiment configured as described above will be described. Here, a case will be described in which the control unit 28 drives and controls the second pump 30 by performing the feedback control on the motor 32 mainly using the output pressure P1 of the first pump 20 or the line pressure PH (estimated value) (to be described later).

<Basic Operation of Hydraulic Control Device 10>

Prior to the description of the operation of the feedback control, the basic operation of the hydraulic control device 10 will be described. In this basic operation, the operation of the hydraulic system which supplies the oil from the reservoir 18 to the continuously variable transmission mechanism 56 via the first pump 20 and the like will be described.

First, when the first pump 20 starts driving due to the drive of the engine 16, the first pump 20 pumps up the oil in the reservoir 18 and starts pumping the pumped-up oil as the first oil. As a result, the first oil flows through the oil passage 22 via the first port 96a and the second port 96b. The output pressure sensor 26 sequentially detects the pressure (output pressure) P1 of the first oil flowing through the oil passage 22, and outputs a signal indicating the detection result to the control unit 28. Further, the engine rotation speed sensor 116 sequentially detects the engine rotation speed New, and sequentially outputs a signal indicating the detection result to the control unit 28.

Figure 3:
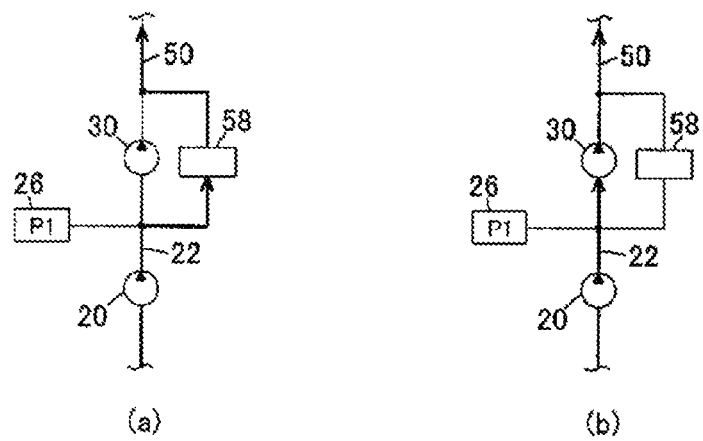
In FIG. 3, (a) is a diagram showing an oil flow in a first state, and (b) is a diagram showing an oil flow in a second state.

In this case, since the motor 32 is not driven, the first oil flowing through the oil passage 22 flows to the oil passage 50 via the bypass valve 58 along the line of the thick line, as schematically shown in (a) of FIG. 3. As a result, the first oil is supplied to the fourth port 96d via the oil passages 50 and 98, and is supplied to the fifth port 96e via the oil passages 50 and 100, and is also supplied to the CR valve 64 via the oil passages 50 and 50c. The CR valve 64 decompresses the supplied first oil, and supplies the decompressed first oil to the control valves 68a and 68b via the oil passage 66, respectively.

Here, control signals (current values IDN, IDR) are supplied in advance from the control unit 28 to the solenoids of the control valves 68a and 68b, and the control valves 68a and 68b are in the valve closed state. Therefore, when the supply of the control signal to each solenoid is stopped, the control valves 68a and 68b are switched from the valve closed state to the valve open state. As a result, the control valve 68a supplies the oil to the regulator valve 52a via the oil passage 74a and also supplies the oil to the seventh port 96g via the oil passage 76a. Further, the control valve 68b supplies the oil to the regulator valve 52b via the oil passage 74b and also supplies the oil to the sixth port 96f via the oil passage 76b.

The regulator valve 52a uses the pressure of the oil supplied via the oil passage 74a as the pilot pressure, and when the pressure of the first oil is greater than or equal to a predetermined pressure, the regulator valve 52a is in a communication state, and the first oil is supplied to the driven pulley 56a via the oil passage 54a. The side pressure sensor 62 sequentially detects the pressure (pulley pressure PDN, which is also the side pressure) of the first oil supplied to the driven pulley 56a, and sequentially outputs a signal indicating the detection result to the control unit 28.

In addition, the regulator valve 52b uses the pressure of the oil supplied via the oil passage 74b as the pilot pressure, and when the pressure (line pressure PH) of the first oil is greater than or equal to a predetermined pressure, the regulator valve 52b is in a communication state, and the first oil is supplied to the drive pulley 56b via the oil passage 54b.

Further, in the line pressure adjusting valve 24, the first oil is supplied to the fourth port 96d, and the oil is supplied from the control valve 68b to the sixth port 96f, while the oil is also supplied from the control valve 68a to the seventh port 96g. In this case, since the pressure (line pressure PH, output pressure P1) of the first oil is greater than the pressure of the oil from each of the control valves 68a and 68b, the first spool 92a moves to the right side in FIG. 2 due to the line pressure PH against the elastic force of the first elastic member 94a and the pressure of the oil. As a result, the recess 102c and the first port 96a communicate with each other, and the first oil can be supplied to a low-pressure system such as the lubrication system 108 as the third oil via the first port 96a, the recesses 102c and 102d, the third port 96c, and the oil passage 90.

In this way, when a control signal is supplied from the control unit 28 to the driver 34 in the state where the first pump 20 is being driven, the driver 34 drives the motor 32 based on the control signal and drives the second pump 30. As a result, the second pump 30 outputs the first oil flowing through the oil passage 22 as the second oil.

Then, when the second oil flows through the oil passage 50 and the flow rate of the second oil (discharge flow rate of the second pump 30) exceeds the flow rate of the first oil (discharge flow rate of the first pump 20), in the bypass valve 58, the pressure (line pressure PH) of the oil on the oil passage 50 side becomes greater than the pressure (output pressure P1) of the oil on the oil passage 22 side. As a result, the bypass valve 58 is in the valve closed state, and the supply of the first oil from the first pump 20 to the continuously variable transmission mechanism 56 and the like via the bypass valve 58 and the oil passage 50 as shown in (a) of FIG. 3 is switched to the supply of the second oil from the second pump 30 to the continuously variable transmission mechanism 56 and the like via the oil passage 50 as shown by the thick line in (b) of FIG. 3. As a result, the flow of the first oil to the oil passage 50 is blocked, and the second oil is pumped by the second pump 30 to the continuously variable transmission mechanism 56 and the like. The second oil is supplied to the fourth port 96d via the oil passages 50 and 98, is supplied to the fifth port 96e via the oil passages 50 and 100, and is supplied to the CR valve 64. Further, the driver 34 sequentially outputs a signal indicating the motor rotation speed Nem of the motor 32 (rotation speed Nep of the second pump 30) to the control unit 28.

The CR valve 64 decompresses the supplied second oil, and supplies the decompressed second oil to the control valves 68a and 68b via the oil passage 66, respectively. Since the control valve 68a is in the valve open state, it supplies the oil to the regulator valve 52a via the oil passage 74a and also supplies the oil to the seventh port 96g via the oil passage 76a. Further, since the control valve 68b is also in the valve open state, it supplies the oil to the regulator valve 52b via the oil passage 74b and also supplies the oil to the sixth port 96f via the oil passage 76b.

As a result, the regulator valve 52a supplies the second oil to the driven pulley 56a with the pressure of the oil supplied via the oil passage 74a as the pilot pressure. The side pressure sensor 62 sequentially detects the pressure (side pressure PDN) of the second oil supplied to the driven pulley 56a and outputs it to the control unit 28. In addition, the regulator valve 52b supplies the second oil to the drive pulley 56b with the pressure of the oil supplied via the oil passage 74b as the pilot pressure.

In this way, since the pressurized second oil is supplied to the driven pulley 56a and the drive pulley 56b, the pressure (output pressure) P1 of the first oil can be reduced, and the load on the first pump 20 can be reduced. In this case, the first spool 92a moves to the right side in FIG. 2 with the pressure (line pressure PH) of the second oil supplied to the fourth port 96d of the line pressure adjusting valve 24 as the pilot pressure, and the output pressure P1 can be reduced by increasing the opening degree (opening area) between the first port 96a and the recess 102c.

Further, in the line pressure adjusting valve 24, the oil is supplied to the sixth port 96f and the seventh port 96g, respectively. In this case, since the line pressure PH is greater than the pressure of the oil, the first spool 92a further moves to the right side in FIG. 2 against the elastic force of the first elastic member 94a and the pressure of the oil. As a result, when the recess 102b and the fifth port 96e communicate with each other, the oil passage 22 and the oil passage 100 communicate with each other. As a result, an increase in the pressure (line pressure PH) of the second oil supplied to the oil passage 100 is suppressed, and the line pressure PH can be maintained at a predetermined pressure.

Here, a state in which the second pump 30 is operated and the second oil is supplied from the second pump 30 will be described in detail. In addition, in the following description, the state in which the second pump 30 is operated and the second oil is supplied from the second pump 30 is referred to as a "servo state."

Here, first, in describing the change of each value in the servo state, the calculation of the target rotation speed NA of the second pump 30 in the servo state will be described. In the calculation of the target rotation speed NA of the second pump 30, first, the control unit 28 calculates the estimated value of the line pressure PH, and calculates an estimated value of the pressure P3 of the third oil (hereinafter referred to as "low hydraulic pressure").

<Estimation of Line Pressure PH>

Figure 4:
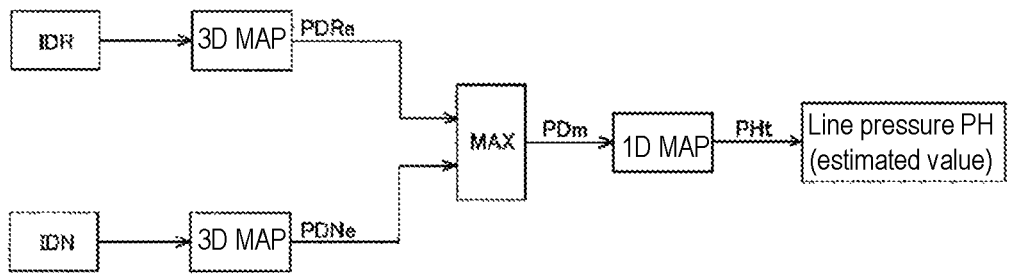
FIG. 4 is a block diagram showing a calculating procedure of an estimated value of the line pressure.

FIG. 4 is a block diagram showing a calculating procedure of an estimated value of the line pressure PH. The control unit 28 uses the current value IDN, which is a control signal supplied to the solenoid of the control valve 68a, and the current value IDR, which is a control signal supplied to the solenoid of the control valve 68b, and refers to various maps stored in advance to calculate an estimated value of the line pressure PH.

The control unit 28 estimates the line pressure PH (estimated line pressure PH) according to a command value with the side pressure (pulley pressure) PDN or the like as the command value.

The side pressure PDN of the driven pulley 56a is the pressure of the oil supplied from the oil passage 50 to the driven pulley 56a via the oil passage 50a, the regulator valve 52a and the oil passage 54a. The side pressure PDN can be adjusted according to the pressure (pilot pressure) of the oil supplied from the control valve 68a to the regulator valve 52a via the oil passage 74a. Further, the side pressure PDR of the drive pulley 56b is the pressure of the oil supplied from the oil passage 50 to the drive pulley 56b via the oil passage 50b, the regulator valve 52b and the oil passage 54b. The side pressure PDR can be adjusted according to the pressure (pilot pressure) of the oil supplied from the control valve 68b to the regulator valve 52b via the oil passage 74b.

Therefore, the control unit 28 refers to a 3D map stored in advance, and obtains an estimated value of the side pressure PDN (estimated side pressure PDNe serving as a command value) according to the control signal (current value IDN) supplied to the solenoid of the control valve 68a. Further, the control unit 28 refers to a 3D map stored in advance, and obtains an estimated value of the side pressure PDR (estimated side pressure PDRe serving as a command value) according to the control signal (current value IDR) supplied to the solenoid of the control valve 68b.

Each 3D map is a three-dimensional map showing the relationship between the current values IDN and IDR and the estimated side pressures PDNe and PDRe generated for each oil temperature To of the first oil or the second oil. Therefore, the control unit 28 specifies the estimated side pressures PDNe and PDRe according to the current oil temperature To and the current values IDN and IDR from the 3D maps.

Next, the control unit 28 determines the higher hydraulic pressure value of the two specified estimated side pressures PDNe and PDRe as a target side pressure PDm. Next, the control unit 28 refers to a 1D map stored in advance, and specifies a target value PHt of the line pressure PH according to the target side pressure PDm. The 1D map is a one-dimensional map showing the relationship between the target side pressure PDm and the line pressure PH.

Finally, the control unit 28 determines a value obtained by adding a predetermined amount of margin to the target value PHt as an estimated value of the line pressure PH (estimated line pressure PH).

<Estimation of Low Hydraulic Pressure P3>

The control unit 28 refers to multiple maps corresponding to each component of the hydraulic system of the transmission 12 stored in advance to estimate the pressure (low hydraulic pressure) P3 of the third oil supplied to the TC regulator valve 104, the oil warmer 106, and the lubrication system 108 via the oil passage 90.

The characteristics of each component configuring the hydraulic system of the transmission 12 are stored in advance as a map. Therefore, the control unit 28 estimates the low hydraulic pressure P3 (estimated value P3e) by using the map of the characteristics of each component stored in advance.

Specifically, the control unit 28 estimates the pressure PCR of the oil passing through the CR valve 64 by using the estimated value of the line pressure PH and the current value ICPC of the control signal supplied to the CPC valve 70. In this case, the control unit 28 obtains the pressure PCR for each temperature and sets the obtained characteristics of the pressure PCR as a map.

Next, the control unit 28 estimates the pressure PLCC of the oil passing through the TC regulator valve 104 by using the map of the pressure PCR and the current value ILCC of the control signal supplied to the solenoid of the LCC valve 72. The pressure PLCC is also the pressure of the oil supplied to the lockup clutch 112. In this case, the control unit 28 obtains the pressure PLCC for each temperature and sets the obtained characteristics of the pressure PLCC as a map.

Next, the control unit 28 obtains the leakage amount of the hydraulic path leading to the driven pulley 56a and the drive pulley 56b via the oil passages 50, 50a and 50b from the maps of the current values IDN and IDR and the side pressures PDN and PDR. Further, the control unit 28 obtains the leakage amount of the LCC valve 72 from the map of the current value ILCC, and obtains the leakage amount of the CR valve 64 and the leakage amount of the CPC valve 70 from the map of the current value ICPC.

Further, the control unit 28 calculates the flow rate (shift flow rate of the driven pulley 56a and the drive pulley 56b) of the second oil to be supplied to the continuously variable transmission mechanism 56 during the shift operation from the area of the pulley chamber of the driven pulley 56a and the drive pulley 56b and the rotation speed of the driven pulley 56a and the drive pulley 56b.

Then, the control unit 28 calculates the flow rate QPH of the oil to be supplied to the high-pressure hydraulic system from the second pump 30 to the driven pulley 56a and the drive pulley 56b by adding the leakage amount in the hydraulic path leading to the driven pulley 56a and drive pulley 56b, the leakage amount of the LCC valve 72, the leakage amount of the CPC valve 70, the leakage amount of the CR valve 64, the shift flow rate, and the leakage amount of the driven pulley 56a and the drive pulley 56b.

Next, the control unit 28 calculates the flow rate Q3 of the third oil supplied to the low-pressure system via the oil passage 90 by subtracting the flow rate QPH from the discharge flow rate of the first oil from the first pump 20.

Next, the control unit 28 calculates an estimated value of the low hydraulic pressure P3 according to the oil temperature To of the first oil or the second oil based on the pressure PLCC of the oil passing through the TC regulator valve 104 and the flow rate Q3 of the third oil.

Figure 5:
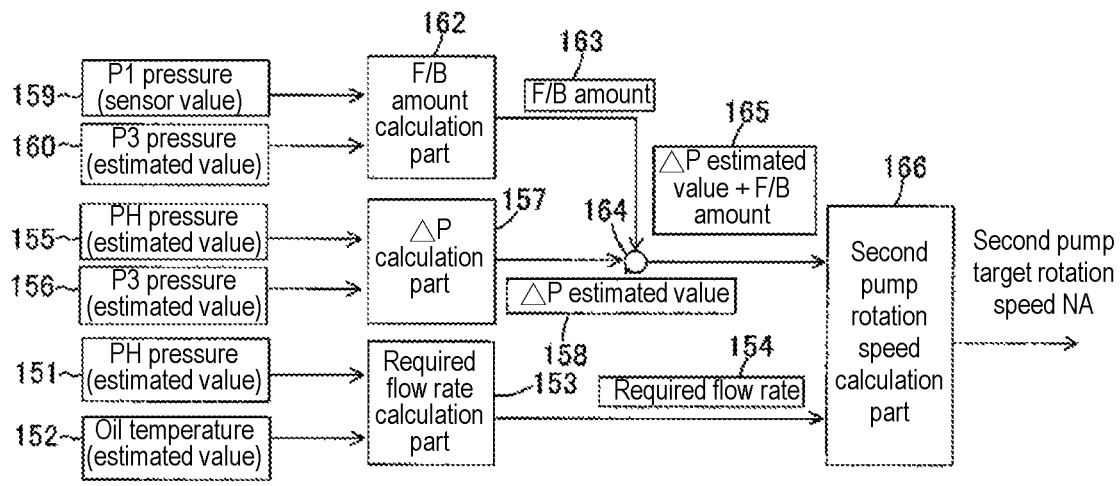
FIG. 5 is a block diagram showing a calculating procedure of the target rotation speed of the second pump.

FIG. 5 is a block diagram showing a calculating procedure of the target rotation speed NA of the second pump 30. In the calculation of the target rotation speed of the second pump 30, as shown in FIG. 5, a required flow rate calculation part 153 calculates an oil flow rate (required flow rate) 154 required for the continuously variable transmission mechanism 56, which is a hydraulic operation part, by using an estimated value 151 of the line pressure PH and an oil temperature 152 detected by the oil temperature sensor 118. Further, a differential pressure calculation part 157 obtains an estimated value 158 of the differential pressure $\Delta P$ (=line pressure PH–low hydraulic pressure P3) by using an estimated value 155 of the line pressure PH and an estimated value 156 of the low hydraulic pressure P3. Further, an F/B amount calculation part 162 calculates a feedback amount 163 by using a detected value 159 of the output pressure P1 detected by the output pressure sensor 26 and an estimated value 160 of the low hydraulic pressure P3. Then, an addition part 164 calculates an addition value 165 by adding the feedback amount 163 to the calculated value 158 of the differential pressure $\Delta P$, and a rotation speed calculation part 166 calculates the target rotation speed NA of the second pump 30 by using this addition value 165 and the required flow rate 154.

Figure 6:
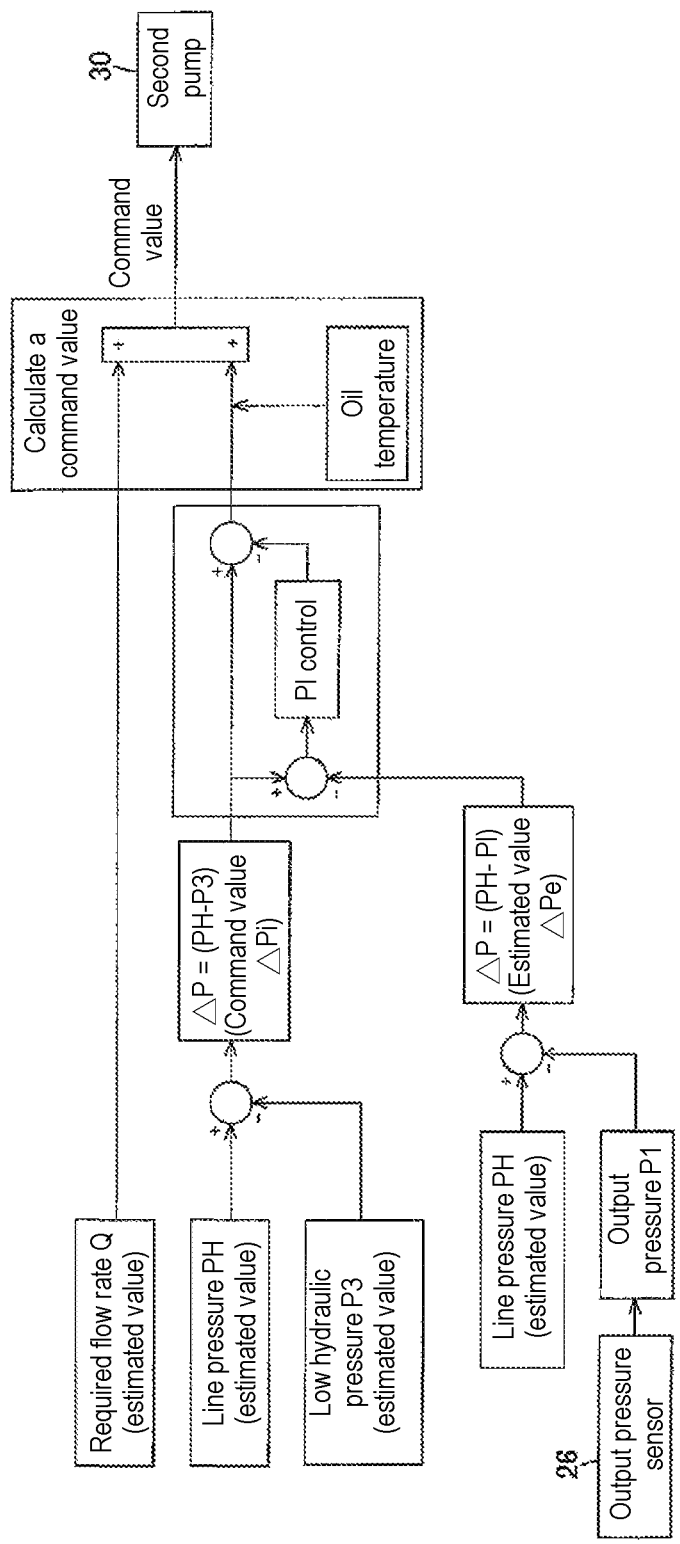
FIG. 6 is a block diagram showing a processing procedure in a control unit which performs the feedback control.

The calculation of the feedback amount by the F/B amount calculation part 162 will be described in detail. FIG. 6 is an illustrating diagram showing processing in the control unit 28 which performs the feedback control with respect to the differential pressure $\Delta P$ by using the output pressure P1 detected by the output pressure sensor 26. That is, FIG. 6 is a control method for feedback-controlling the output pressure P1 with the estimated value of the low hydraulic pressure P3 as the target value by feeding back to the control unit 28 the change amount of the output pressure P1 as the rotation speed of the second pump 30 increases.

When the estimated value of the line pressure PH is estimated and the estimated value of the low hydraulic pressure P3 is estimated, the control unit 28 generates a command value $\Delta Pi$ (=PHe–P3e) of the differential pressure $\Delta P$ by subtracting the estimated value of the low hydraulic pressure P3 from the estimated value of the line pressure PH. Further, the control unit 28 calculates an estimated value $\Delta Pe$ (=PHe–P1) of the differential pressure $\Delta P$ by subtracting the output pressure P1 detected by the output pressure sensor 26 from the estimated value of the line pressure PH.

Next, the control unit 28 obtains a deviation Ae (=$\Delta Pi$–$\Delta Pe$) by subtracting the estimated value $\Delta Pe$ from the command value $\Delta Pi$. The obtained deviation Ae is passed through a proportional integration element (PI control) and added to the command value $\Delta Pi$. That is, the control unit 28 performs the feedback control with the deviation Ae as the feedback amount for the command value $\Delta Pi$.

In this case, Ae=$\Delta Pi$–$\Delta Pe$=(PHe–P3e)–(PHe–P1)=P1–P3e. Therefore, the control unit 28 performs the feedback control for the command value $\Delta Pi$ so that the output pressure P1 becomes an estimated value of the low hydraulic pressure P3. Next, the control unit 28 adjusts the command value $\Delta Pi$ after the feedback control in consideration of the oil temperature To of the first oil or the second oil as well. After that, the required flow rate Q and the adjusted command value $\Delta Pi$ are used to calculate the command value of the rotation speed for the second pump 30.

Figure 7:
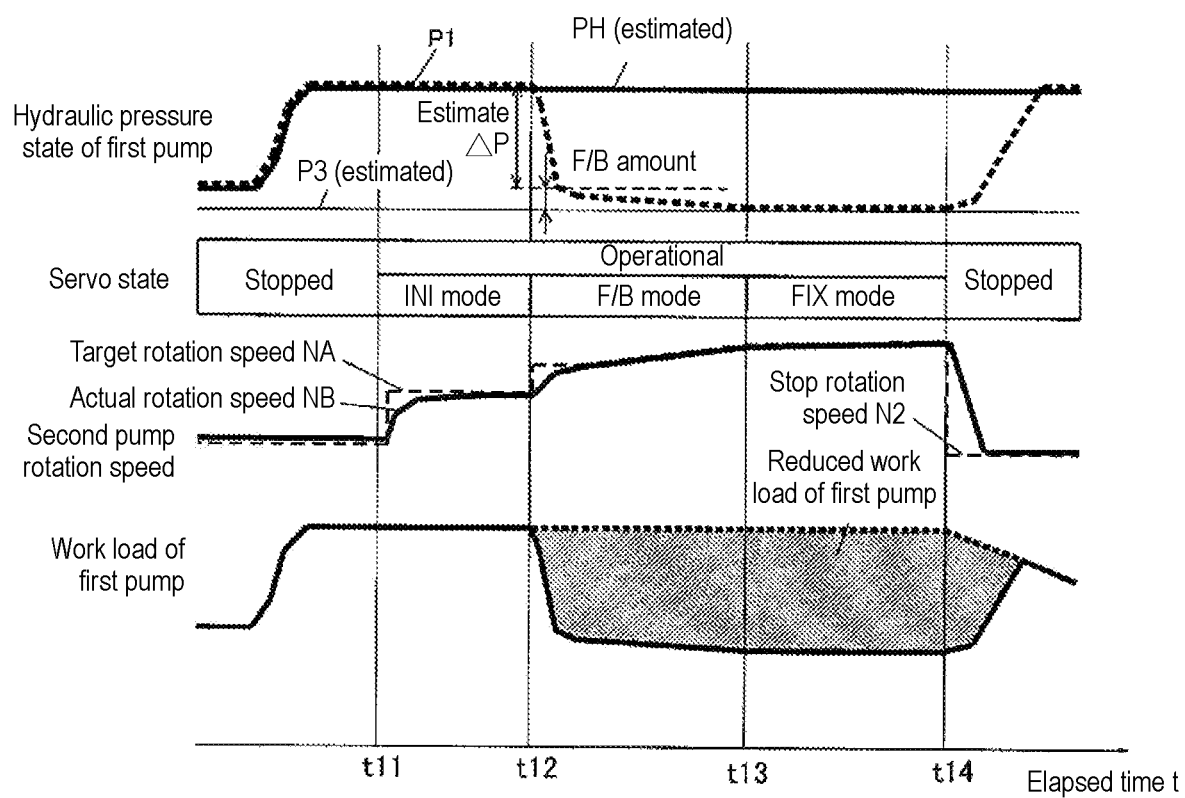
FIG. 7 is a timing chart for illustrating changes in each value in the servo state.

FIG. 7 is a timing chart for illustrating changes in each value in the servo state. This timing chart shows the changes of the output pressure P1, the line pressure PH (estimated value), the low hydraulic pressure P3 (estimated value), the operation state (operational/stopped) and the operation mode (initial mode, feedback mode, fixed mode) of the second pump 30, the target rotation speed NA and the actual rotation speed NB of the second pump 30 with respect to the elapsed time t.

In the timing chart of FIG. 7, the second pump 30 is stopped before the time point t11. In this state, the first oil is supplied from the first pump 20 to the continuously variable transmission mechanism 56 via the bypass valve 58 and the oil passage 50 (see (a) of FIG. 3). Therefore, the output pressure P1 which is the pressure of the first oil flowing through the oil passage 50 is equal to the line pressure PH (output pressure P1=line pressure PH). Further, the low hydraulic pressure P3 is less than the line pressure PH and the output pressure P1 (line pressure PH>low hydraulic pressure P3, output pressure P1>low hydraulic pressure P3).

Then, when the second pump 30 operates at the time point t11, it is then switched to the supply of the second oil from the second pump 30 to the continuously variable transmission mechanism 56 via the oil passage 50 (see (b) of FIG. 3). Therefore, after the state shown in (b) of FIG. 3 is reached, the pressure of the second oil becomes the line pressure PH.

Here, the control unit 28 of the hydraulic control device 10 controls the motor 32 via the driver 34 so that the actual rotation speed NB of the second pump 30 (torque of the second pump 30) increases with respect to the elapsed time t. Accordingly, the flow rate of the second oil discharged from the second pump 30 gradually increases as the actual rotation speed NB of the second pump 30 increases. As a result, after the time point t11, the output pressure P1 can be gradually reduced with the elapsed time t.

Then, in the operation state (servo state) of the second pump 30, the second pump 30 is operated by sequentially passing through each mode of the initial mode (INI mode), the feedback mode (F/B mode) and the fixed mode (FIX mode). In the initial mode, the target rotation speed NA of the second pump 30 increases at the time point t11, and the actual rotation speed NB gradually increases following the target rotation speed NA. Further, in this initial mode, the target rotation speed NA of the second pump 30 is a rotation speed that can discharge only the flow rate required for consumption in the hydraulic operation part (target rotation speed corresponding to only the required flow rate 154 in FIG. 5). Therefore, the output pressure P1 does not decrease during the initial mode. When it is determined that the actual rotation speed NB of the second pump 30 matches the target rotation speed NA, the initial mode ends.

In the feedback mode following the initial mode, the output pressure P1 gradually decreases toward the low hydraulic pressure P3 as the actual rotation speed NB of the second pump 30 gradually increases. At the same time, the feedback control of the rotation speed of the second pump 30 is performed. That is, the control unit 28 performs the feedback control of the rotation speed of the second pump 30 by using the output pressure P1 detected by the output pressure sensor 26, the estimated value of the line pressure PH, and the estimated value of the low hydraulic pressure P3. In this feedback mode, the output pressure P1 is feedback-controlled with the low hydraulic pressure P3 as the target value by feeding back the change amount of the output pressure P1 due to the increase in the actual rotation speed NB of the second pump 30 to the control unit 28.

As a result, for example, due to the error between the control value of each pressure and the actual pressure value and the variation in the discharge performance of the second pump 30, even if the output pressure P1 cannot be reduced to the low hydraulic pressure P3 by using the target rotation speed of open control (the target rotation speed corresponding to the calculated value 158 of the differential pressure ΔP (=line pressure PH–low hydraulic pressure P3) shown in FIG. 5), in the feedback mode after the time point t12, the output pressure P1 can be reduced to the low hydraulic pressure P3 by using the target rotation speed to which the feedback amount (F/B amount 163 in FIG. 5) is added.

When the feedback mode ends at the time point t13, the output pressure P1 drops to the low hydraulic pressure P3 at this time point (P1≈P3), and then the output pressure P1 is maintained at the low hydraulic pressure P3 (fixed mode). That is, in the fixed mode, the state of P1≈P3 is maintained by keeping the rotation speed of the second pump 30 substantially constant. After that, when the operation of the second pump 30 is stopped at the time point t14, the target rotation speed NA of the second pump 30 becomes the stop rotation speed (≈0), and the actual rotation speed NB also decreases following the target rotation speed NA and gradually becomes the stop rotation speed. As a result, after the time point t14, the output pressure P1 gradually increases toward the line pressure PH. When the output pressure P1 is reduced by the operation of the second pump 30 as described above, the work load of the first pump 20 is reduced, and the fuel efficiency of the vehicle 14 can be expected to be improved.

Figure 8:
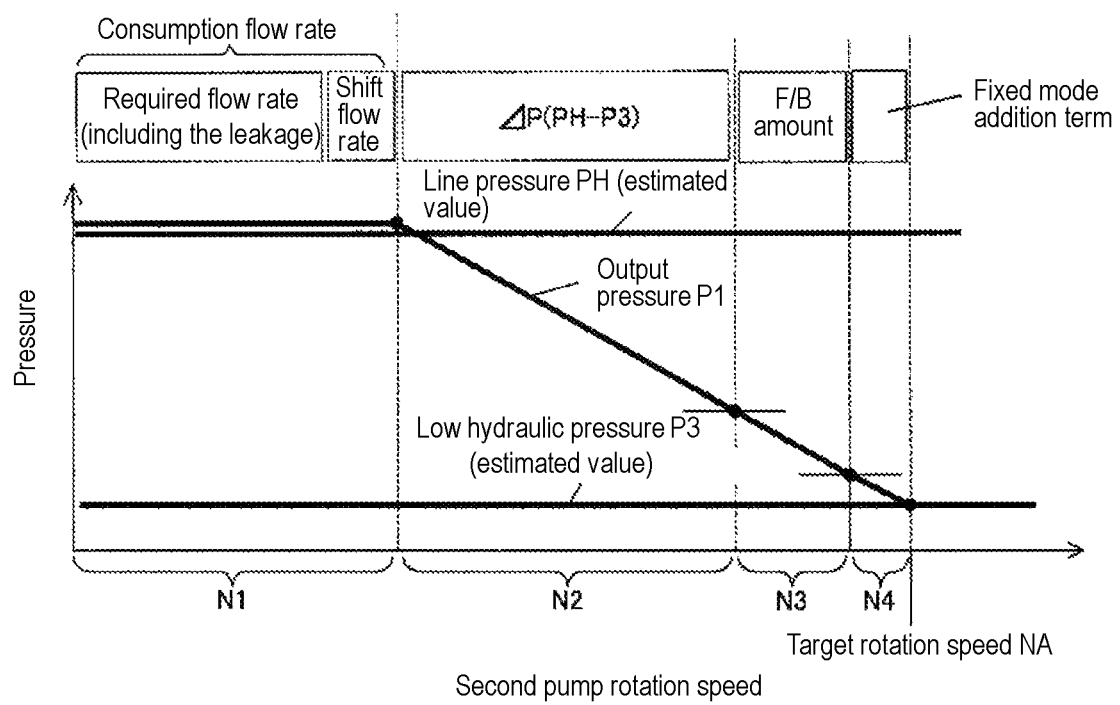
FIG. 8 is a graph for illustrating the target rotation speed of the second pump.

Here, the target rotation speed of the second pump 30 in the servo state will be described in detail. In the servo state, as shown in FIG. 5, the target rotation speed NA of the second pump 30 is calculated, and the second pump 30 is operated based on the target rotation speed NA. At this time, the target rotation speed NA of the second pump 30 is set so that the output pressure P1 matches the estimated value of the low hydraulic pressure P3. FIG. 8 is a graph for illustrating the target rotation speed NA of the second pump 30, with the horizontal axis representing the rotation speed of the second pump 30, and the vertical axis representing the pressure. As shown in the graph in the figure, the final target rotation speed NA of the second pump 30 in the second state is the total value of a first rotation speed N1, a second rotation speed N2, a third rotation speed N3, and a fourth rotation speed N4. The first rotation speed N1 is a rotation speed required to discharge the oil of the flow rate consumed by the continuously variable transmission mechanism 56 (the total of the shift flow rate and the required flow rate including the leakage flow rate). The second rotation speed N2 is a rotation speed required to reduce the output pressure P1 from the estimated value of the line pressure PH to the estimated value of the low hydraulic pressure P3. The third rotation speed N3 is a rotation speed corresponding to the feedback (F/B) amount when performing the feedback correction for correcting the difference (error amount) between the output pressure P1, which has been reduced at the second rotation speed N2, and the estimated value of the low hydraulic pressure P3. The fourth rotation speed N4 is a rotation speed as a fixed mode addition term, which is added to ensure that the output pressure P1 matches the estimated value of the low hydraulic pressure P3 in the fixed mode. That is, the final target rotation speed NA of the second pump 30=the first rotation speed N1+the second rotation speed N2+the third rotation speed N3+the fourth rotation speed N4. Further, here, the difference (error amount) between the output pressure P1, which has been reduced at the second rotation speed N2, and the estimated value of the low hydraulic pressure P3 may be caused because in some cases, there is an error (deviation of the estimated value) in the estimated value of the line pressure PH, and due to the error, even if the output pressure P1 is reduced based on the second rotation speed N2 calculated by using the estimated value of the line pressure PH, it does not completely match the estimated value of the low hydraulic pressure P3, and thus there is a difference between the output pressure P1 and the estimated value of the low hydraulic pressure P3. Therefore, this difference is corrected by the third rotation speed N3, which is the feedback (F/B) amount. Hereinafter, the calculation method of the first to fourth rotation speeds N1 to N4 will be described.

Figure 9:
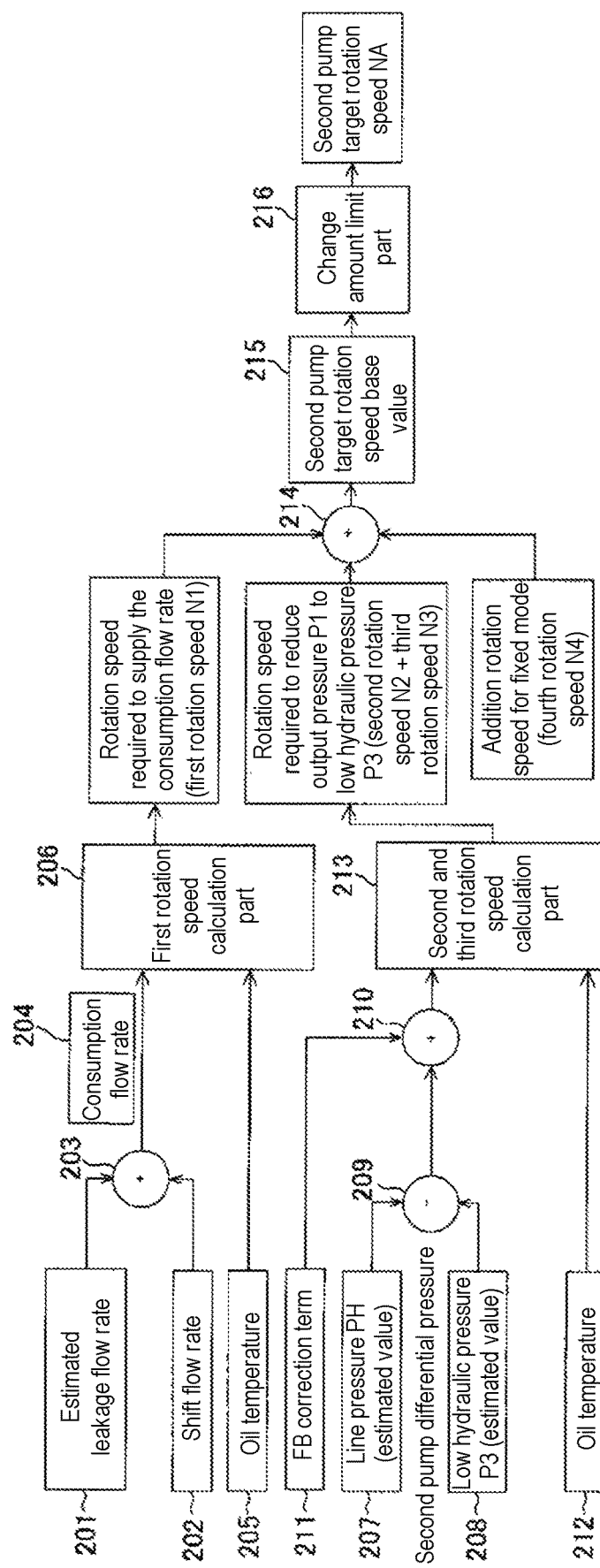
FIG. 9 is a block diagram showing a calculating procedure of the target rotation speed of the second pump.

FIG. 9 is a block diagram showing a calculating procedure of the target rotation speed NA of the second pump 30. As shown in the figure, in the calculation of the target rotation speed NA of the second pump 30, first, a consumption flow rate 204 of the continuously variable transmission mechanism 56 is calculated by adding an estimated leakage flow rate 201 of the oil passage 50 through which the oil with the line pressure PH flows and a shift flow rate 202 of the continuously variable transmission mechanism 56 by an addition part 203, and a first rotation speed calculation part 206 calculates the first rotation speed N1 which is the rotation speed required to supply the oil of the consumption flow rate (total of the required flow rate and the shift flow rate) of the continuously variable transmission mechanism 56 based on the consumption flow rate 204 and the oil temperature 205.

Figure 10:
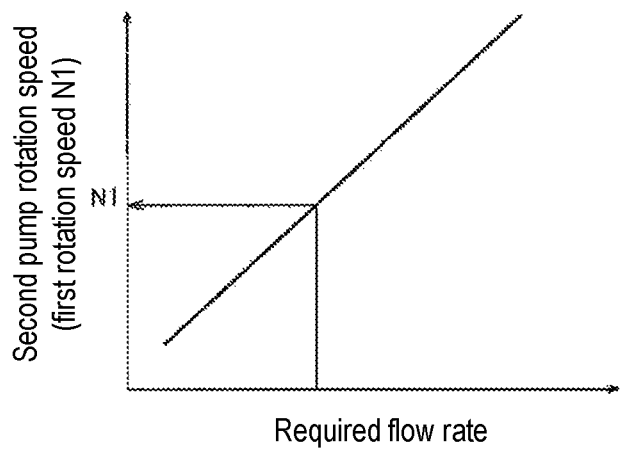
FIG. 10 is a graph for calculating the first rotation speed.

FIG. 10 is a graph for calculating the first rotation speed N1. In the graph of the figure, the horizontal axis represents the required flow rate, and the vertical axis represents the rotation speed of the second pump 30. As shown in the figure, the first rotation speed N1 is calculated by searching for a value on a map by using the map showing the relationship between the required flow rate and the rotation speed generated for each oil temperature. Here, the required flow rate and the rotation speed are in a proportional relationship for each oil temperature. Therefore, the first rotation speed N1 is determined from the required flow rate and the oil temperature.

With reference back to FIG. 9, next, an addition part 210 adds a feedback correction term 211 to a value obtained by subtracting an estimated value 208 of the low hydraulic pressure P3 from an estimated value 207 of the line pressure PH by a subtraction part 209. Based on this value and an oil temperature 212, a second and third rotation speed calculation part 213 calculates the total value of the second rotation speed N2 and the third rotation speed N3, which is the rotation speed of the second pump 30 required to reduce the output pressure P1 to the estimated value of the low hydraulic pressure P3.

Figure 11:
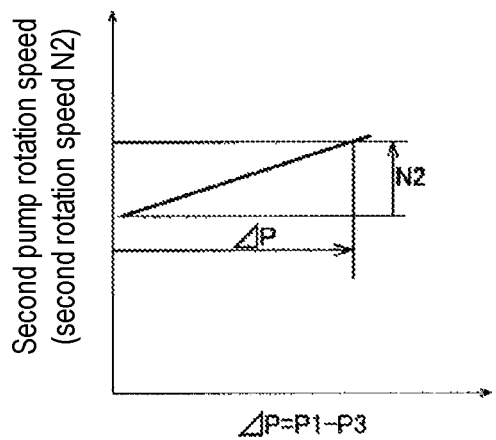
FIG. 11 is a graph for calculating the second rotation speed.

FIG. 11 is a graph for calculating the rotation speed (second rotation speed N2) of the second pump 30 required to reduce the output pressure P1 to the estimated value of the low hydraulic pressure P3. In the graph of the figure, the horizontal axis represents the differential pressure ΔP=output pressure P1−low hydraulic pressure P3 (estimated value), and the vertical axis represents the rotation speed of the second pump 30. In the calculation of the second rotation speed N2, the second rotation speed N2 is calculated by searching for a value on a map by using the map showing the relationship between ΔP=output pressure P1−low hydraulic pressure P3 (estimated value) and the rotation speed generated for each oil temperature. As shown in the graph of the figure, in a state where the second pump 30 supplies the consumption flow rate (required flow rate) of the continuously variable transmission mechanism 56, the differential pressure and the flow rate of the second pump 30 are in a proportional relationship for each oil temperature. Therefore, the second rotation speed N2, which is the required rotation speed, is determined from ΔP=output pressure P1−low hydraulic pressure P3 (estimated value) and the oil temperature. Further, the third rotation speed N3, which is the feedback amount, is a rotation speed calculated by the procedure shown in FIG. 6.

Further, in the fixed mode, even if the rotation speed of the second pump 30 is maintained at the minimum rotation speed such that the output pressure P1 becomes equal to the estimated value of the low hydraulic pressure P3, since the ratio of the continuously variable transmission mechanism 56 changes from that state, the output pressure P1 may become a value that does not match the estimated value of the low hydraulic pressure P3. Therefore, in the fixed mode, an addition rotation speed for the fixed mode (fourth rotation speed N4) is added to the target rotation speed of the second pump 30 as a control for more accurately matching the output pressure P1 with the estimated value of the low hydraulic pressure P3.

Figure 12:
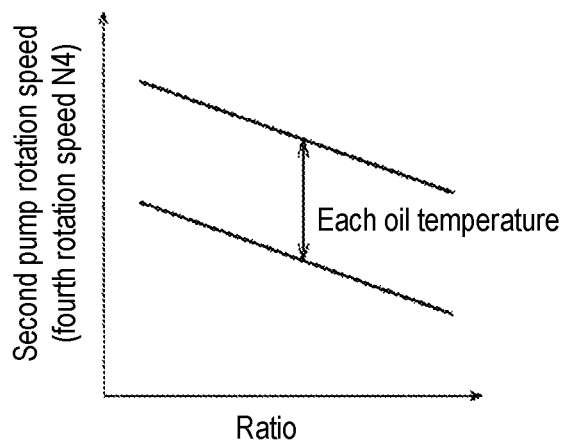
FIG. 12 is a graph for calculating the fourth rotation speed.

FIG. 12 is a graph for calculating the addition rotation speed (fourth rotation speed N4) for the fixed mode, and the horizontal axis represents the ratio (gear ratio) of the continuously variable transmission mechanism 56, and the vertical axis represents the addition rotation speed (fourth rotation speed N4). As shown in the graph of the figure, the addition rotation speed for the fixed mode is calculated based on a map that defines the relationship between the ratio (gear ratio) of the continuously variable transmission mechanism 56 for each oil temperature and the addition rotation speed. Here, the reason why the ratio (gear ratio) of the continuously variable transmission mechanism 56 is required as a parameter is that the shift flow rate differs even if the change rate of the ratio is the same, and the reason why the oil temperature is required is that the discharge performance of the second pump 30 differs depending on the oil temperature.

With reference back to FIG. 9 again, a base value 215 of the target rotation speed NA of the second pump 30 is calculated by adding by an addition part 214 the first rotation speed N1 calculated by the first rotation speed calculation part 206, the total of the second rotation speed N2 and the third rotation speed N3 calculated by the second and third rotation speed calculation part 213, and the fourth rotation speed N4 which is the addition rotation speed for the fixed mode, and a final target rotation speed NA of the second pump 30 is calculated by adding a change amount limit to the base value 215 by a change amount limit part 216. Further, the change amount limit added by the change amount limit part 216 is usually to converge the actual rotation speed NB with respect to the target rotation speed NA of the second pump 30 to the target rotation speed NA by the change amount that can prevent undershoot and overshoot (deviation to the downward value and the upward value). However, when the deviation between the target rotation speed NA and the actual rotation speed NB is large, by setting a larger change amount than this change amount, the actual rotation speed NB is converged to the target rotation speed NA in a shorter time.

Figure 13:
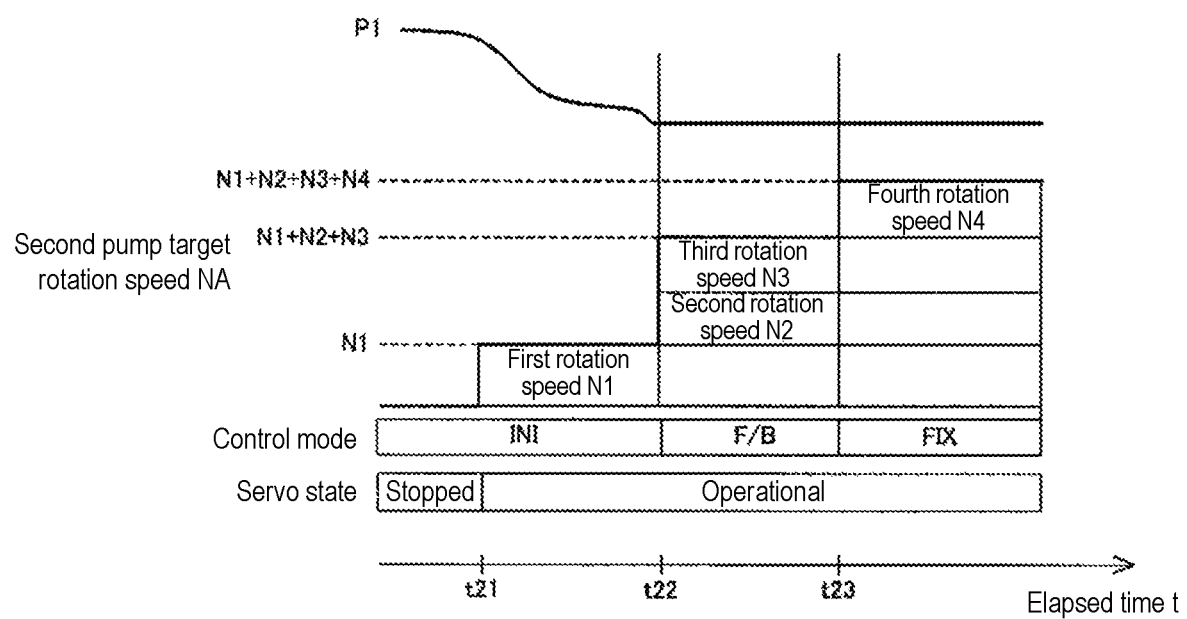
FIG. 13 is a timing chart showing changes in the target rotation speed of the second pump in the servo state.

FIG. 13 is a timing chart showing changes in the target rotation speed of the second pump 30 in the servo state. This timing chart shows the changes of each of the output pressure P1, the target rotation speed NA of the second pump 30, changes of the control mode (initial mode, F/B mode, fixed mode), and the operational/stopped state of the second pump 30 with respect to the elapsed time t. As shown in the timing chart of the figure, after the time point t21 when the second pump 30 operates in the initial mode, the target rotation speed NA of the second pump 30=the first rotation speed N1. After that, when the initial mode transitions to the feedback mode at the time point t22, the second rotation speed N2 and the third rotation speed N3 are added to the target rotation speed NA of the second pump 30, and the target rotation speed NA=the first rotation speed N1+the second rotation speed N2+the third rotation speed N3. Then, when the feedback mode transitions to the fixed mode at the time point t23, the fourth rotation speed N4 is further added to the target rotation speed NA of the second pump 30, and the target rotation speed NA=the first rotation speed N1+the second rotation speed N2+the third rotation speed N3+the fourth rotation speed N4.

Figure 14:
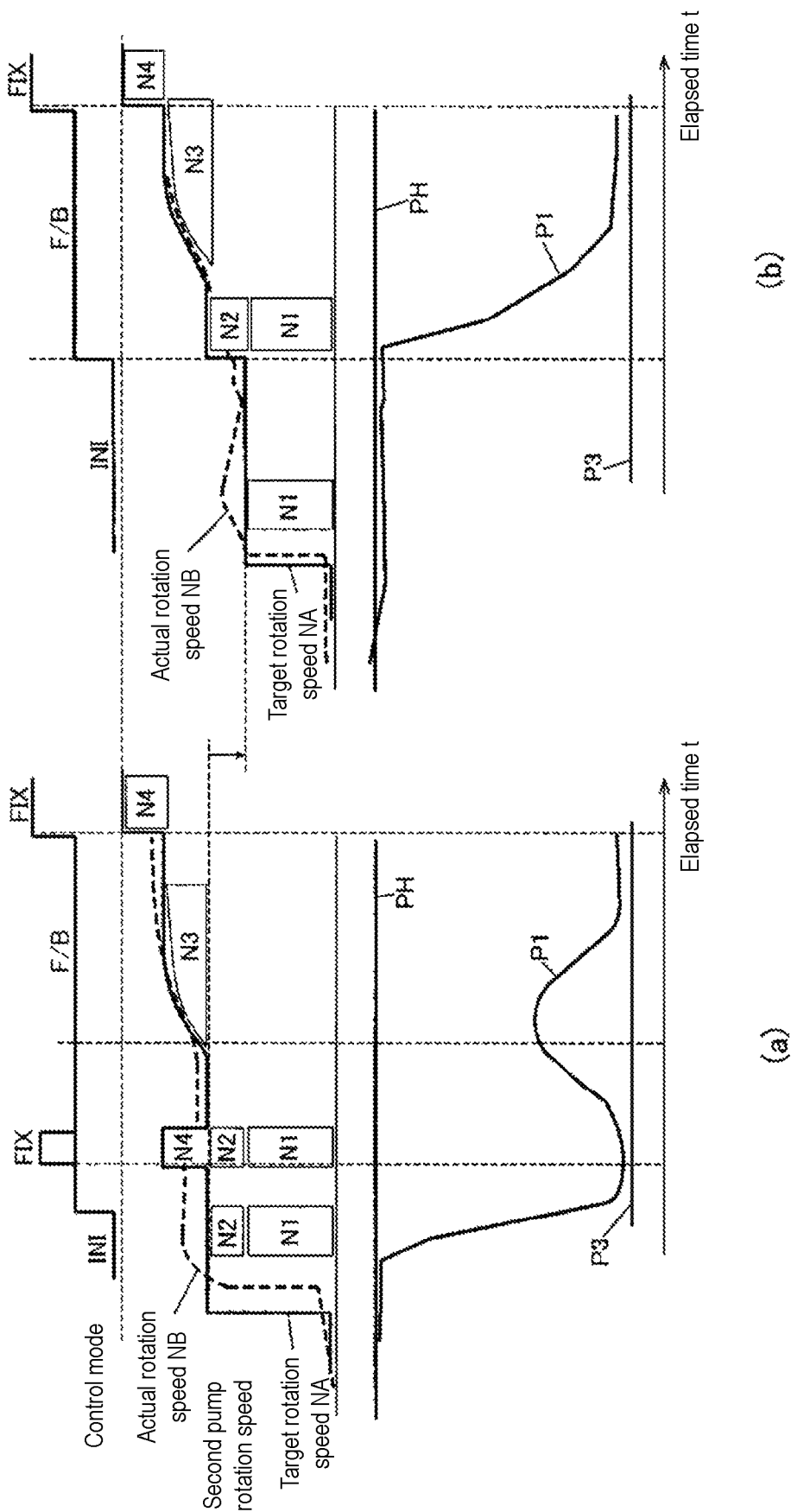
FIG. 14 is a timing chart for illustrating the target rotation speed of the second pump in the initial mode.

As described above, in the hydraulic control device of the embodiment, the target rotation speed of the second pump 30 in the initial mode is the first rotation speed N1 alone, and the reason for this will be described. In FIG. 14, (a) is a timing chart showing changes in each value when the target rotation speed of the second pump 30 in the initial mode is the first rotation speed N1+the second rotation speed N2, and (b) is a timing chart showing changes in each value when the target rotation speed in the initial mode is the first rotation speed N1 alone. The timing charts in the figure show the changes of each of the changes in the control mode (initial mode, F/B mode, fixed mode), the target rotation speed NA and the actual rotation speed NB of the second pump 30, the line pressure PH (estimated value), the output pressure P1, and the low hydraulic pressure P3 (estimated value) with respect to the elapsed time t. In the hydraulic control device of the embodiment, as shown in (b) of the figure, the target rotation speed NA of the second pump 30 in the initial mode is the first rotation speed N1 alone, and the target rotation speed NA in the feedback mode following the initial mode is the first rotation speed N1+the second rotation speed N2+the third rotation speed N3, and a condition for transitioning from the initial mode to the feedback mode is that it is determined that the output pressure P1 matches the estimated value of the line pressure PH as described later. On the other hand, as shown in (a) of the figure, if the target rotation speed NA in the initial mode is the first rotation speed N1+the second rotation speed N2, due to the addition of the second rotation speed N2 in the initial mode, the output pressure P1 starts to decrease during the initial mode (before transitioning to the feedback mode) and becomes a value close to the low hydraulic pressure P3. As a result, it is determined that the feedback mode ends immediately after the transition to the feedback mode, and the mode transitions to the fixed mode, whereby a phenomenon occurs in which the fourth rotation speed N4, which is a fixed mode addition term, is added before the third rotation speed N3, which is the feedback addition amount, is added. Therefore, the transition from the initial mode to the feedback mode cannot be stably determined, and as a result, there is a problem that the time required for the feedback mode to actually end becomes longer, and that it takes a long time for the actual rotation speed NB of the second pump 30 to reach the target rotation speed NA.

In contrast, as shown in (b) of FIG. 14, when the target rotation speed NA in the initial mode is the first rotation speed N1 alone and the target rotation speed NA in the feedback mode following the initial mode is the first rotation speed N1+the second rotation speed N2+the third rotation speed N3, then the output pressure P1 does not decrease during the initial mode, and the state of matching the line pressure PH is maintained. As a result, there is no longer a possibility that it is determined that the feedback mode ends immediately after the transition to the feedback mode, so the transition from the initial mode to the feedback mode can be stably determined, and the time required to actually end the feedback mode can be kept short. Therefore, it is possible to shorten the time required for the actual rotation speed NB of the second pump 30 to reach the target rotation speed NA.

Figure 15:
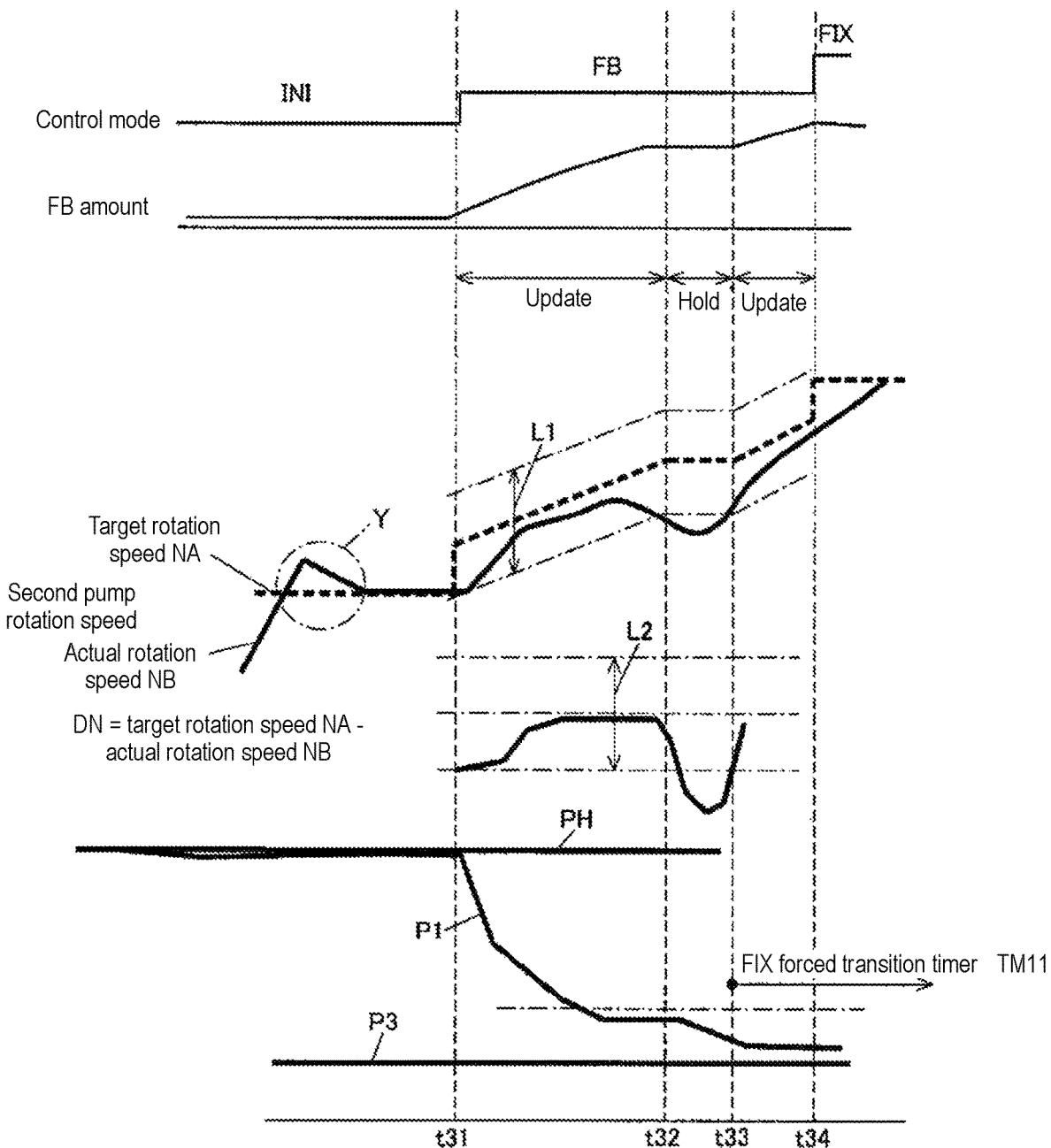
FIG. 15 is a timing chart showing changes in each value in the feedback mode.

Here, the details of the control in the feedback mode will be described. FIG. 15 is a timing chart showing changes in each value in the feedback mode. The timing chart in the figure shows the changes of each of the changes in the control mode (initial mode, F/B mode, fixed mode), the feedback amount (the feedback amount of the target rotation speed NA of the second pump 30), the target rotation speed NA and the actual rotation speed NB of the second pump 30, the value DN of the difference between the target rotation speed NA and the actual rotation speed NB, the output pressure P1 (sensor value), the line PH (estimated value), and the low hydraulic pressure P3 (estimated value) and the low hydraulic pressure P3 (estimated value) with respect to the elapsed time t.

Here, in the initial mode before the time point t31, the operation state of the second pump 30 transitions from the initial mode to the feedback mode when the feedback mode transition condition described later is satisfied. Prior to the time point t31, the target rotation speed NA of the second pump 30 is NA=the first rotation speed N1. Then, when the operation state of the second pump 30 is set to the feedback mode at the time point t31, the second rotation speed N2 and the third rotation speed N3 are then added to the target rotation speed NA of the second pump 30. Then, during the feedback mode from the time point t31 to the time point t34, the time region (update region) in which the feedback amount is updated is between the time point t31 and the time point t32, and in the update region, the target rotation speed NA gradually increases as the feedback amount is updated. Then, when the actual rotation speed NB exceeds a predetermined range L1 (falling outside the range) with respect to the target rotation speed NA at the time point t32, the update of the feedback amount is stopped, and thereafter, it becomes a hold region where the update of the feedback amount is temporarily stopped until the time point t33. In the hold region, since the update of the feedback amount is stopped, the target rotation speed NA becomes constant. Further, since the actual rotation speed NB is fed back to the target rotation speed (instructed rotation speed) NA by the feedback control inside the driver 34 for the second pump 30, even in the hold region, the actual rotation speed NB of the second pump 30 follows the target rotation speed NA.

After that, when the actual rotation speed NB falls within the predetermined range L1 with respect to the target rotation speed NA at the time point t33, the hold region transitions to the update region again, and the update of the feedback amount is restarted. Here, the range L1 having a predetermined value range is set on the high rotation speed side and the low rotation speed side with respect to the target rotation speed NA, and the update region and the hold region are switched depending on whether the actual rotation speed NB is within that range. Alternatively, as shown in the changes in the value DN of the difference between the target rotation speed NA and the actual rotation speed NB shown in FIG. 15, it is also the same by determining whether the value DN of the difference is within a predetermined range L2.

After that, when the fixed mode transition condition described later is satisfied at the time point t34, the operation state of the second pump 30 transitions from the feedback mode to the fixed mode. Therefore, after the time point t34, the target rotation speed NA and the feedback amount of the second pump 30 are fixed (constant) in the fixed mode. In the fixed mode, the target rotation speed NA of the second pump 30 is NA=the first rotation speed N1+the second rotation speed N2+the third rotation speed N3+the fourth rotation speed N4.

In this way, in the feedback mode, time regions for performing the feedback control include the update region in which the feedback amount of the target rotation speed NA is updated and the hold region in which the update of the feedback amount of the target rotation speed NA is temporarily stopped. Further, switching from the update region in which the feedback amount is updated to the hold region in which the update of the feedback amount is temporarily stopped is performed based on that the actual rotation speed NB of the second pump 30 with respect to the target rotation speed NA of the second pump 30 has become outside the predetermined range L1.

Here, the feedback mode transition condition for transitioning from the initial mode to the feedback mode will be described. The feedback mode transition condition is a condition that it is determined that the output pressure P1 matches the estimated value of the line pressure PH in the initial mode. The reason for this is as follows. That is, when the second pump 30 transitions from the stopped state to the initial mode, since the control start mode of the second pump 30 is set, an overshoot occurs in which the actual rotation speed NB of the second pump 30 deviates significantly upward from the target rotation speed NA, as shown by the reference numeral Y in FIG. 15. As a result, the bypass valve 58 may close and a differential pressure may be generated between the line pressure PH and the output pressure P1 depending on the variation and the like of the solid product. When the mode transitions to the feedback mode as it is when such a phenomenon occurs, the control amount (feedback amount) in the feedback mode may not be calculated correctly. Therefore, here, the feedback mode transition condition is a condition that it is determined that the output pressure P1 matches the estimated value of the line pressure PH in the initial mode.

Figure 16:
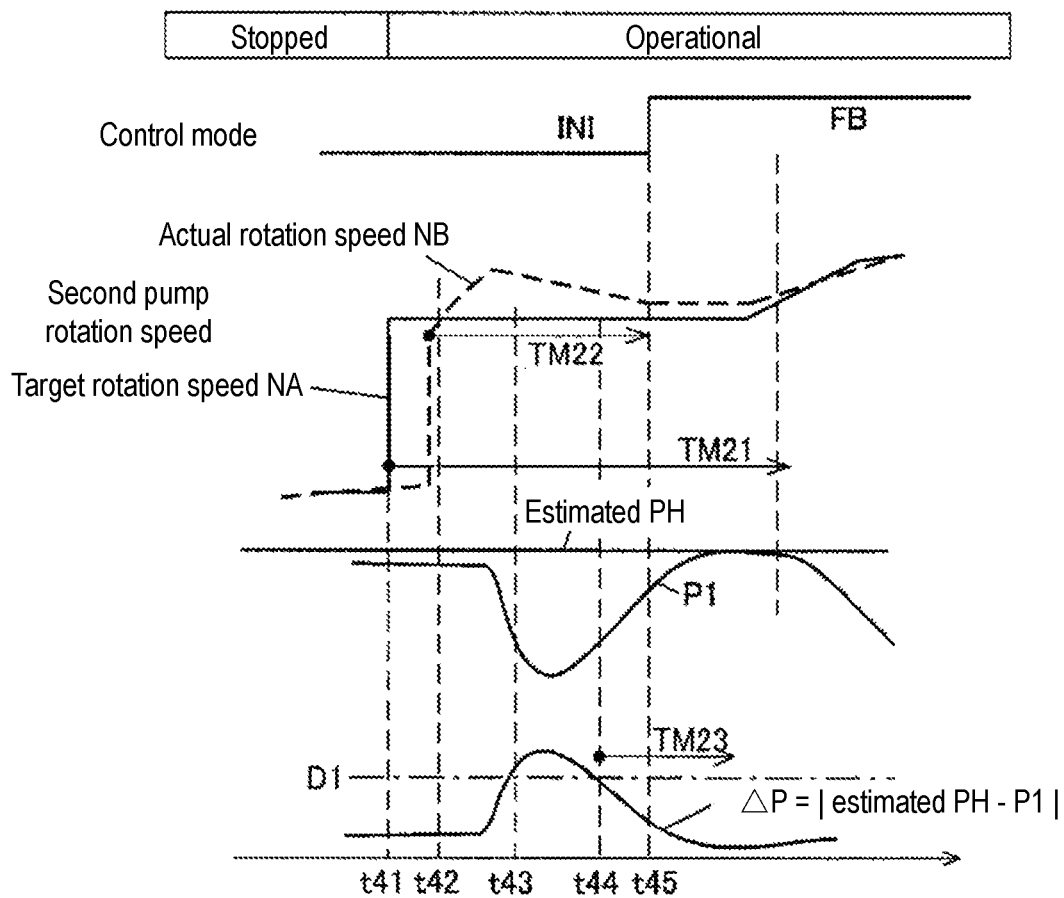
FIG. 16 is a graph for illustrating determination of matching between the output pressure and the estimated value of the line pressure.

FIG. 16 is a graph for illustrating determination of matching between the output pressure P1 and the estimated value of the line pressure PH. The graph in the figure shows the changes of each of the operation state (stopped/operational) of the second pump 30, the changes in the control mode (initial mode and F/B mode), the target rotation speed NA and the actual rotation speed NB of the second pump 30, the output pressure P1, the line pressure PH (estimated value), and the differential pressure between the line pressure PH (estimated value) and the output pressure P1 ($\Delta P=$|line pressure (estimated value)−output pressure P1|) with respect to the elapsed time t.

Here, the target rotation speed NA of the second pump 30 becomes the first rotation speed N1 at the time point t41 in the initial mode. As a result, the actual rotation speed NB of the second pump 30 also starts to increase. Further, at the time point t41, a first timer (feedback forced transition timer) TM21 starts the countdown. The first timer TM21 is a backup timer for preventing a case of being unable to transition to the feedback mode when countdown completion conditions of a second timer TM22 and a third timer TM23 (to be described later) are not satisfied. After that, when the difference between the target rotation speed NA and the actual rotation speed NB of the second pump 30 becomes less than or equal to a predetermined value at the time point t42, the second timer TM22 starts the countdown. After that, the differential pressure $\Delta P$ between the line pressure PH (estimated value) and the output pressure P1 exceeds a predetermined threshold value D1 at the time point t43, and the differential pressure $\Delta P$ falls below the threshold value D1 at the time point t44. As a result, the third timer (confirmation timer) TM23 starts the countdown. The third timer TM23 is reset when the differential pressure $\Delta P$ exceeds the threshold value D1. When both the second timer TM22 and the third timer TM23 complete the countdown, it is determined that the output pressure P1 and the estimated value of the line pressure PH match, and the mode transitions to the feedback mode. Even if both the second timer TM22 and the third timer TM23 do not complete the countdown, when the first timer TM21 completes the countdown, the feedback mode is forcibly transitioned to.

Next, the fixed mode transition condition for transitioning from the feedback mode to the fixed mode will be described. For a fixed mode transition condition, in a state where the difference between the output pressure P1 and the estimated value of the low hydraulic pressure P3 is equal to or less than a predetermined value PM (P1−P3 (estimated value)<PM), and the change amount of the difference between the output pressure P1 and the estimated value of the low hydraulic pressure P3 is greater than or equal to a first predetermined value DP1 and less than or equal to a second predetermined value DP2 (DP1<A (P1−P3 (estimated value))<DP2), the mode transitions to the fixed mode when a predetermined time has elapsed. Therefore, when the timer (fixed mode forced transition timer) TM11 (see FIG. 15) for measuring the time in the state where the change amount of the difference between the output pressure P1 and the estimated value of the low hydraulic pressure P3 is greater than or equal to the predetermined value DP1 and less than or equal to the predetermined value DP2 (DP1<A (P1−P3 (estimated value))<DP2) completes the countdown, the mode transitions to the fixed mode. Further, if the above conditions are not satisfied during the countdown of the timer TM11, the timer TM11 is reset.

The reason why the fixed mode forced transition timer TM11 is required under the above fixed mode transition condition is as follows. That is, when the feedback state is continued, the feedback amount is continuously updated, whereby the target rotation speed NA may continue to increase and the fuel efficiency of the vehicle may deteriorate. Then, since the degree of deterioration of fuel efficiency is larger compared with a case where the feedback amount is fixed, the fixed mode forced transition timer TM11 is used to transition to the fixed mode.

Figure 17:
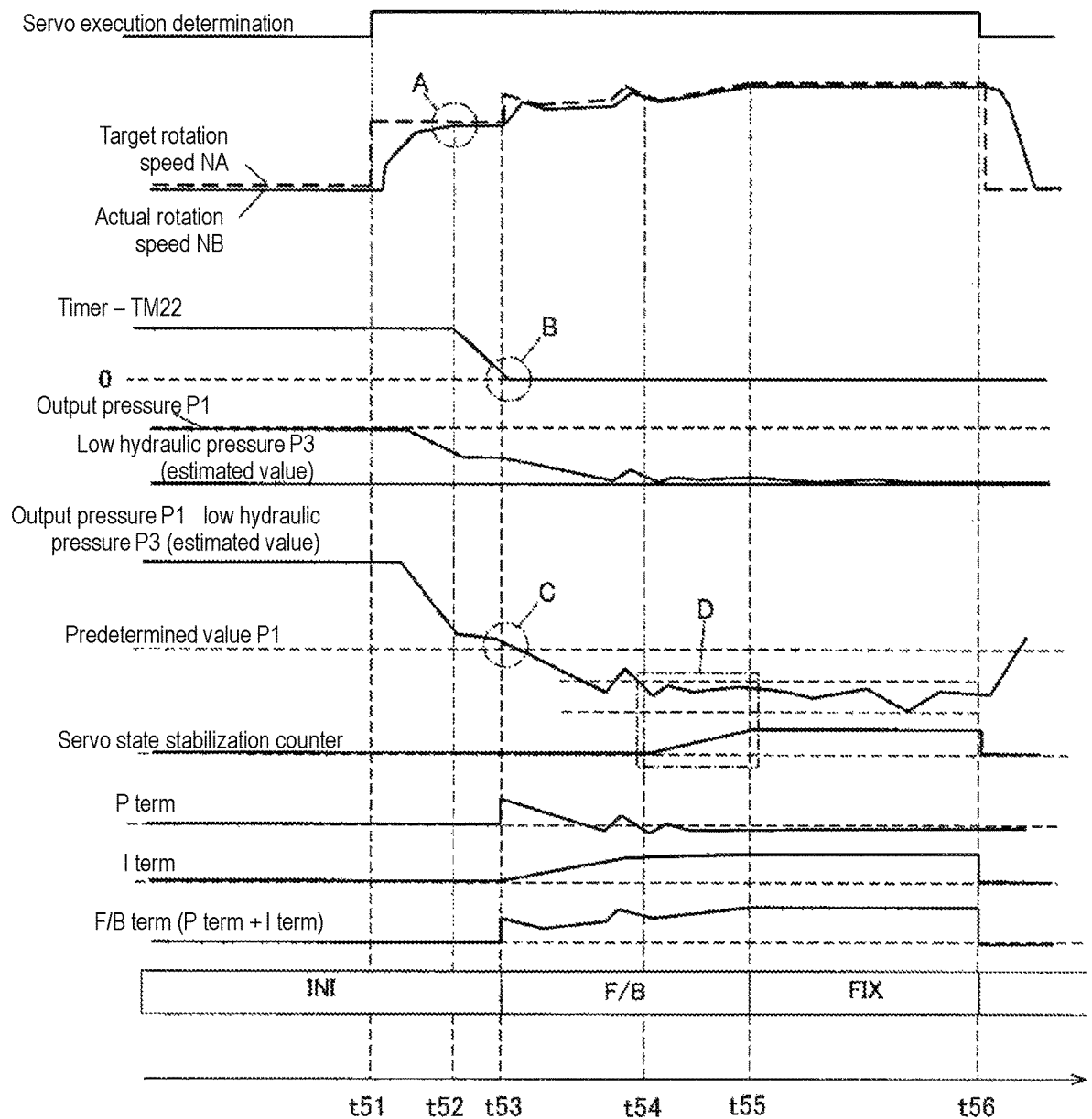
FIG. 17 is a timing chart showing changes in each value in each mode of the initial mode, the feedback mode, and the fixed mode.

Next, the change of each value in the initial mode, the feedback mode, and the fixed mode will be described. FIG. 17 is a timing chart showing changes of each value in each mode. The timing chart shows the changes of each of the servo execution determination flag (execution/non-execution), the target rotation speed NA and the actual rotation speed NB of the second pump 30, the feedback mode transition determination timer TM22, the output pressure P1, the low hydraulic pressure P3 (estimated value), the output pressure P1−the low hydraulic pressure P3 (estimated value), the servo state stabilization counter, and the feedback correction amount (P term, I term, F/B term) with respect to the elapsed time t.

In the timing chart of FIG. 17, in the initial mode before the time point t53, the target rotation speed NA of the second pump 30 increases by changing the servo execution determination flag from 0 (non-execution) to 1 (execution) at the time point t51. After that, the actual rotation speed NB of the second pump 30 increases following the target rotation speed NA. As a result, the output pressure P1 gradually decreases. When the difference between the actual rotation speed NB and the target rotation speed NA becomes less than or equal to a predetermined value at the time point t52 (reference numeral A), the feedback mode transition determination timer TM22 starts the countdown. After that, the feedback mode transition determination timer TM22 completes the countdown at the time point t53 (reference numeral B), and the output pressure P1−the low hydraulic pressure P3 (estimated value) becomes less than or equal to a predetermined value P1 (reference numeral C), whereby the mode transitions from the initial mode to the feedback mode. As a result, thereafter, the rotation speed (third rotation speed N3) corresponding to a correction amount M for the feedback control is added to the target rotation speed of the second pump 30. The correction amount M for the feedback control here is a value corresponding to the F/B term, which is the sum (P term+I term) of the P term (proportional term) and the I term (integral term).

After that, when it is determined that the change amount of the output pressure P1−the low hydraulic pressure P3 (estimated value) between the time point t54 and the time point t55 in the feedback mode is within a predetermined range (reference numeral D), the mode transitions to the fixed mode at the time point t55. That is, here, the servo state stabilization counter completes the countdown when the change amount of the output pressure P1–the low hydraulic pressure P3 (estimated value) is within the predetermined range to transition to the fixed mode. In the fixed mode after the time point t55, the target rotation speed NA of the second pump 30 becomes constant. Then, when the servo execution determination flag becomes 0 (non-execution) at the time point t56, the second pump 30 stops and the fixed mode ends.

Figure 18:
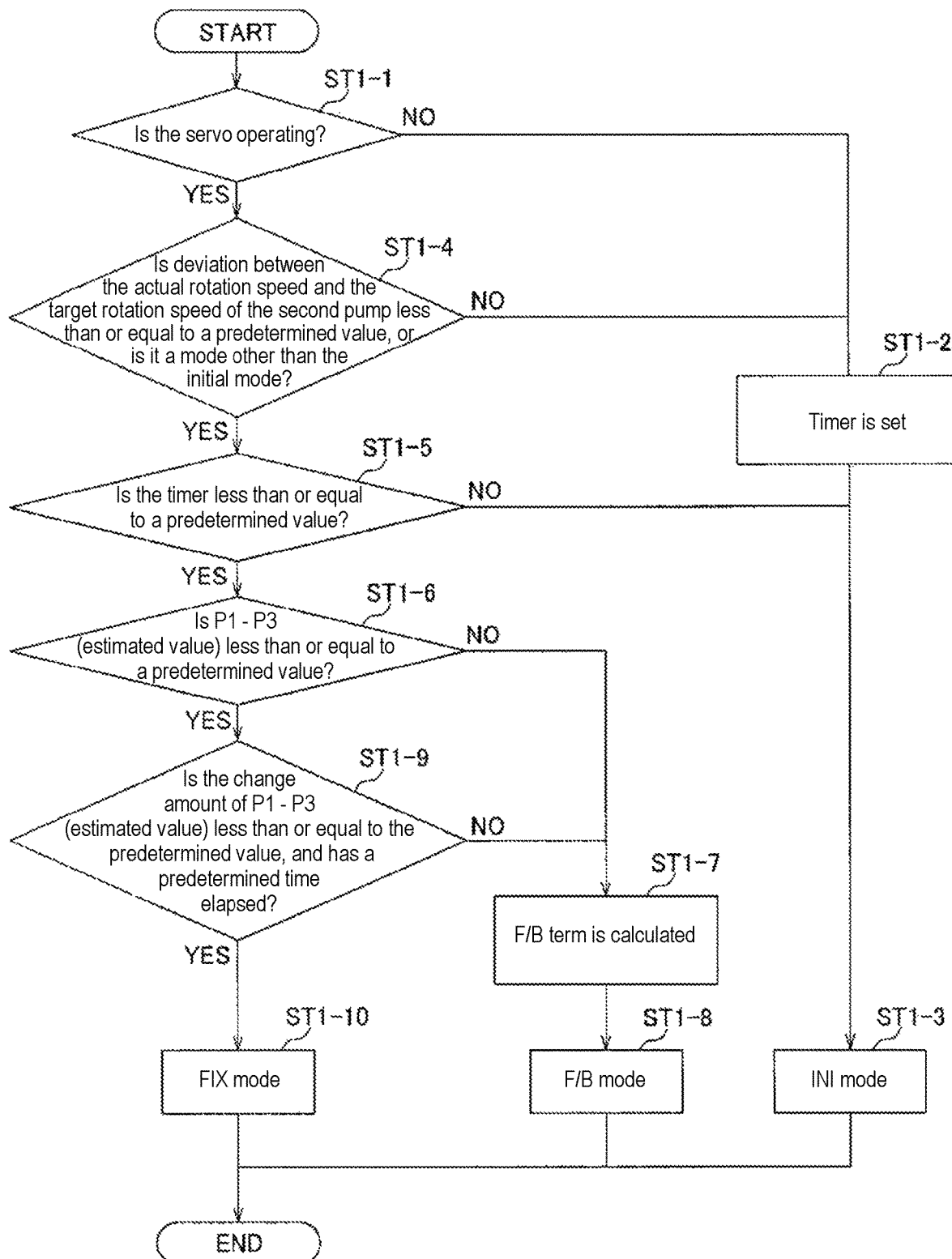
FIG. 18 is a flowchart showing transition conditions of the initial mode, the feedback mode, and the fixed mode.

FIG. 18 is a flowchart showing transition conditions of the initial mode, the feedback mode, and the fixed mode, and is a flow showing the flow of processing corresponding to the timing chart of FIG. 17. Here, first, it is determined whether the servo is operating (servo execution determination flag is 1 (execution)) (step ST1-1), and as a result, when the servo is not operating (NO), the timer (feedback mode transition determination timer) TM22 is set (step ST1-2) to set the initial mode (step ST1-3). On the other hand, when the servo is operating in step ST1-1 (YES), then it is determined whether the deviation between the target rotation speed NA and the actual rotation speed NB of the second pump 30 is less than or equal to a predetermined value, or whether it is a mode other than the initial mode (step ST1-4). As a result, when the deviation between the target rotation speed NA and the actual rotation speed NB of the second pump 30 is not less than or equal to the predetermined value and is in the initial mode (NO), the timer (feedback mode transition determination timer) TM22 is set (step ST1-2) to set the initial mode (step ST1-3). On the other hand, when in step ST1-4 the deviation between the target rotation speed NA and the actual rotation speed NB of the second pump 30 is less than or equal to the predetermined value or the mode is other than the initial mode (YES), then it is determined whether the timer TM22 is less than or equal to a predetermined value (completing the countdown) (step ST1-5). As a result, when the timer TM22 is not less than or equal to the predetermined value (NO), the initial mode is set (step ST1-3), and when the timer TM22 is less than or equal to the predetermined value (YES), then it is determined whether the output pressure P1–the low hydraulic pressure P3 (estimated value) is less than or equal to a predetermined value (step ST1-6). As a result, when the output pressure P1–the low hydraulic pressure P3 (estimated value) is not less than or equal to the predetermined value (NO), the feedback term is calculated (step ST1-7), and the mode transitions to the feedback mode (F/B mode) (step ST1-8). On the other hand, when in step ST1-6 the output pressure P1–the low hydraulic pressure P3 (estimated value) is less than or equal to the predetermined value (YES), then it is determined whether the change amount of the output pressure P1–the low hydraulic pressure P3 (estimated value) is less than or equal to the predetermined value and whether a predetermined time has elapsed (step ST1-9). As a result, when the change amount of the output pressure P1–the low hydraulic pressure P3 (estimated value) is not less than or equal to the predetermined value or when the predetermined time has not elapsed (NO), the feedback term is calculated (step ST1-7), and the mode transitions to the feedback mode (step ST1-8). On the other hand, when in step ST1-9 the change amount of the output pressure P1–the low hydraulic pressure P3 (estimated value) is less than or equal to the predetermined value and the predetermined time has elapsed (YES), the mode transitions to the fixed mode (step ST1-10).

Here, in the flowchart of FIG. 18, when the deviation between the target rotation speed NA and the actual rotation speed NB of the second pump 30 is less than or equal to the predetermined value in step ST1-4 (YES), it corresponds to the reference numeral A in the timing chart of FIG. 17; when the timer is less than or equal to the predetermined value in step ST1-5 (YES), it corresponds to the reference numeral B; when the output pressure P1–the low hydraulic pressure P3 (estimated value) is less than or equal to the predetermined value in step ST1-6 (YES), it corresponds to the reference numeral C; and when the change amount of the output pressure P1–the low hydraulic pressure P3 (estimated value) is less than or equal to the predetermined value and the predetermined time has elapsed in step ST1-9 (YES), it corresponds to the reference numeral D.

As described above, according to the hydraulic control device of the embodiment, in the calculation of the feedback amount with respect to the target rotation speed NA of the second pump 30, time regions for performing calculation of the feedback amount include the update region in which the feedback amount of the target rotation speed NA is updated and the hold region in which the update of the feedback amount of the target rotation speed NA is temporarily stopped. As a result, compared with a case where the update of the feedback amount is continuously updated without being temporarily stopped, since an excessive increase in the rotation speed of the second pump 30, which is an electric pump, can be suppressed, the discharge pressure of the second pump 30 can be stabilized. Therefore, since the operation of the hydraulic operation part can be stabilized, the effect of reducing the fuel consumption of the vehicle can be obtained more reliably.

Further, in the hydraulic control device of the embodiment, the update region is switched to the hold region when the actual rotation speed NB of the second pump 30 with respect to the target rotation speed NA of the second pump 30 falls outside the predetermined range, whereby the actual rotation speed NB can be prevented from becoming a value that deviates significantly from the target rotation speed NA, and the accuracy of the actual rotation speed NB with respect to the target rotation speed NA can be improved.

Further, since the hold region is switched to the update region when the actual rotation speed NB of the second pump 30 with respect to the target rotation speed NA of the second pump 30 returns to the predetermined range, the update of the feedback amount is restarted when the actual rotation speed NB is close to the target rotation speed NA, whereby the actual rotation speed NB can be transitioned to the final target rotation speed NA earlier.

Further, in the hydraulic control device of the embodiment, the feedback control is ended and the mode transitions to the fixed mode in which the target rotation speed NA of the second pump 30 is constant on the condition that the predetermined time has elapsed since the difference between the output pressure P1 (which is the pressure value of the first oil) and the estimated value of the low hydraulic pressure P3 (which is the pressure value of the third oil) becomes less than or equal to the predetermined value and that the difference between the output pressure P1 and the estimated value of the low hydraulic pressure P3 per predetermined time has become within the predetermined range.

If the feedback control is continued, since the feedback amount is continuously updated, the target rotation speed NA of the second pump 30 continues to increase, and the fuel efficiency of the vehicle may deteriorate. Then, the degree of deterioration of fuel efficiency is larger compared with a case where the feedback amount is fixed. Therefore, here, the feedback mode is transitioned to the fixed mode according to the above conditions.

Although the embodiments of the disclosure have been described above, the disclosure is not limited to the above embodiments, and various modifications may be made within the scope of claims and the technical ideas described in the specification and drawings.

What is claimed is:

1. A hydraulic control device in which a second pump and a bypass valve that are driven by a motor are connected in parallel between a first pump and a hydraulic operation part of a transmission, and which is switchable between a first state of supplying a first oil from the first pump to the hydraulic operation part via the bypass valve and a second state of pressurizing with the second pump the first oil supplied from the first pump and supplying the pressurized first oil as a second oil to the hydraulic operation part, the hydraulic control device comprising:

a hydraulic pressure detection part which detects an oil pressure of the first oil on a suction side in the second pump; and a control part which calculates a target rotation speed of the second pump in the second state, wherein the control part uses a pressure value of the first oil detected by the hydraulic pressure detection part, an estimated value of a pressure value of oil supplied to the hydraulic operation part, and an estimated value of a pressure value of a third oil supplied from the first pump to another hydraulic operation part or a lubrication target operating at a lower pressure than the hydraulic operation part in the transmission to calculate the target rotation speed of the second pump for matching the pressure value of the first oil with the estimated value of the pressure value of the third oil, and subtracts the estimated value of the pressure value of the third oil from the pressure value of the first oil detected by the hydraulic pressure detection part to calculate a feedback amount with respect to the target rotation speed, wherein time regions for performing calculation of the feedback amount comprise:

an update region in which the feedback amount with respect to the target rotation speed is updated; and a hold region in which update of the feedback amount with respect to the target rotation speed is temporarily stopped.

2. The hydraulic control device according to claim 1, wherein switching from the update region to the hold region is performed based on that an actual rotation speed of the second pump with respect to the target rotation speed of the second pump has become outside a predetermined range.

3. The hydraulic control device according to claim 2, wherein switching from the hold region to the update region is performed based on that the actual rotation speed of the second pump with respect to the target rotation speed of the second pump has changed from being outside the predetermined range to being within the predetermined range.

4. The hydraulic control device according to claim 1, wherein the control part ends a feedback control and transitions to a control which keeps the target rotation speed constant on a condition that a predetermined time has elapsed since a difference between the pressure value of the first oil and the estimated value of the pressure value of the third oil becomes less than or equal to a predetermined value and that the difference between the pressure value of the first oil and the estimated value of the pressure value of the third oil per predetermined time has become within a predetermined range.

5. The hydraulic control device according to claim 2, wherein the control part ends a feedback control and transitions to a control which keeps the target rotation speed constant on a condition that a predetermined time has elapsed since a difference between the pressure value of the first oil and the estimated value of the pressure value of the third oil becomes less than or equal to a predetermined value and that the difference between the pressure value of the first oil and the estimated value of the pressure value of the third oil per predetermined time has become within a predetermined range.

6. The hydraulic control device according to claim 3, wherein the control part ends a feedback control and transitions to a control which keeps the target rotation speed constant on a condition that a predetermined time has elapsed since a difference between the pressure value of the first oil and the estimated value of the pressure value of the third oil becomes less than or equal to a predetermined value and that the difference between the pressure value of the first oil and the estimated value of the pressure value of the third oil per predetermined time has become within a predetermined range.

* * * * *